(12) United States Patent
Wong

(10) Patent No.: US 6,185,288 B1
(45) Date of Patent: *Feb. 6, 2001

(54) MULTIMEDIA CALL SIGNALLING SYSTEM AND METHOD

(75) Inventor: Chi-Keung Wong, Nepean (CA)

(73) Assignee: Nortel Networks Limited, Montreal (CA)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/992,765

(22) Filed: Dec. 18, 1997

(51) Int. Cl.$^7$ ..................................... H04M 7/00
(52) U.S. Cl. ..................... 379/219; 370/352; 709/206
(58) Field of Search ..................... 379/88.17, 220, 379/221, 230, 219, 900; 370/352, 354, 355, 356, 400, 401, 404, 357, 384, 385, 465, 466, 467; 709/206

(56) References Cited

U.S. PATENT DOCUMENTS

| | | | |
|---|---|---|---|
| 4,837,798 | 6/1989 | Cohen et al. | 379/88.14 |
| 5,406,557 | * 4/1995 | Baudoin | 370/407 |
| 5,416,834 | 5/1995 | Bales et al. | 379/211 |
| 5,594,732 | * 1/1997 | Bell et al. | 370/401 |
| 5,608,786 | * 3/1997 | Gordon | 370/352 |
| 5,630,060 | * 5/1997 | Tang et al. | 709/238 |
| 5,640,446 | * 6/1997 | Everett et al. | 379/115 |
| 5,659,542 | * 8/1997 | Bell et al. | 370/496 |
| 5,825,857 | * 10/1998 | Reto et al. | 379/114 |
| 5,852,660 | * 12/1998 | Lindquist et al. | 379/230 |
| 5,872,926 | * 2/1999 | Levac et al. | 709/206 |
| 5,910,946 | * 6/1999 | Csapo | 370/328 |
| 5,917,900 | * 6/1999 | Allison et al. | 379/220 |
| 5,933,425 | * 8/1999 | Iwata | 370/351 |
| 5,943,412 | * 8/1999 | Courvoisier | 379/220 |
| 6,011,794 | * 1/2000 | Mordowitz et al. | 370/389 |

OTHER PUBLICATIONS

John Enck, Managing Multivendor Networks, Mar. 20, 1997, Que, Macmillan Computer Publishing, ISBN 0789711796, Chapter 1.*

* cited by examiner

Primary Examiner—Krista Zele
Assistant Examiner—Roland G. Foster

(57) ABSTRACT

A system and method for performing call signalling for multimedia call setups. A user equipped with calling terminals of various types may initiate a call from any of these terminals, and the call is intercepted and handled by the system. A calling agent looks up an E-mail address for the called party, and sends a setup request E-mail to a called agent associated with the called party. The called agent determines the current terminal that the callee is using, and together with the calling agent a call medium and other parameters are established. Then a connection is made between a calling terminal and the current terminal. This provides a generic signalling system for a callee using a wireline terminal, wireless terminal, or H.323 terminal to be connected to a called terminal also being any one of these or other types.

34 Claims, 16 Drawing Sheets

MULTIMEDIA CALL SIGNALLING SYSTEM AND METHOD

FIELD OF THE INVENTION

The invention relates to a system and method for multimedia call signalling.

BACKGROUND OF THE INVENTION

There are many known call setup methods for use in setting up calls within the PSTN (public switched telephone network) though new methods are still evolving.

Data telephony, over a data network such as the Internet for example, will likely soon start to carry a significant amount of multimedia traffic, and has its own call setup methods for establishing calls over the relevant data network. Various different data networks exist including the Internet, wireline networks, cellular networks, and PCS (personal communications systems) networks for example. In addition, calls other than voice calls of course are establishable over such data networks. These include FAX calls, video calls, T.120 conference calls etc.

When a user wants to make a regular phone call, the user's phone informs a switch via a sequence of electrical signals, or a message. Software in the switch will engage a process to find out where the called phone is located by performing an address translation. The address translation will return the information related to which trunk and which protocol should be used to signal a remote CO (captive office) which will ring the called phone.

In the case of an H.323 terminal, a call setup request is sent in a message to a component called the gatekeeper to perform address translation. The address passed to the gatekeeper can be a symbolic name or an Internet address. In the current H.323 implementation, the gatekeeper will use the H.245 and H.225 protocols to complete the call.

It would be desirable to be able to place calls of various types from a PSTN based terminal for example for connection to a data network based terminal, and call setup methods must be established for this. Existing solutions have focused on a few particular instances of the problem such as Internet to PSTN voice calls.

These existing solutions provide a single solution for one or two media, but do not provide an approach to solving the problem in a general fashion.

One of the technical challenges in solving this problem is the complexity and diversity of the types of call processing equipment, call transmission media and protocols involved all of which are based on various technologies.

SUMMARY OF THE INVENTION

It is an object of the invention to obviate or mitigate one or more of the above identified disadvantages.

According to a first broad aspect, the invention provides a multimedia call signalling method comprising the steps of: a calling terminal initiating a call with a call setup request including a user identifier; a calling agent receiving the call setup request and looking up an E-mail address corresponding with the user identifier; the calling agent sending a call setup E-mail with said E-mail address to a called agent; the called agent looking up a current terminal identifier which identifies a current terminal associated with the user identifier on the basis of the call setup E-mail message; and the called agent and the calling agent coordinating a call setup between the calling terminal and the current terminal.

According to a second broad aspect, the invention provides a multimedia call signalling end system comprising a calling agent for connection to a network for coordinating the establishment of a connection between a calling terminal served by the calling agent and another terminal, the calling agent comprising: a) means for receiving a call setup request from the calling terminal including a user identifier; b) means for looking up an E-mail address corresponding with the user identifier; c) means for generating a call setup E-mail with said E-mail address and mailing it to said address; and d) first means for coordinating the establishment of an outgoing connection between the calling terminal and the another terminal.

A first element empowering this invention is based on an encapsulation principle. Because different telephony and communication networks use different signalling protocols, to make the signalling protocol independent the call setup requests are encapsulated in a common format. This invention devises a scheme to encapsulate an outgoing call request with all associated attributes preferably using the MIME (Multipurpose Internet Mail Extension) principle from Internet Engineering Task Force (IETF).

A second element empowering this invention is the use of an E-mail address or an electronic address for the user. Once used, this conceals the discrepancies or deficiencies of the terminals to be connected and broadens the choice of the medium which can be used for the connection.

A third preferred element empowering this invention is the use of MIME application typing so that an electronic message server can associate any required processing with various components in the message. As a result, this invention provides a generic mechanism to support multi-media multi-channel and multi-device communication call setup.

The broad application domain of the signalling protocol allows it to be applied to PSTN, Internet and cable networks and to other network types as it becomes appropriate. It also enables the establishment of multi-media phone calls that support multiple terminals and connections.

Advantageously, the system provided by some embodiments of the invention is applicable to existing telephony equipment without the need for any change to customer equipment.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
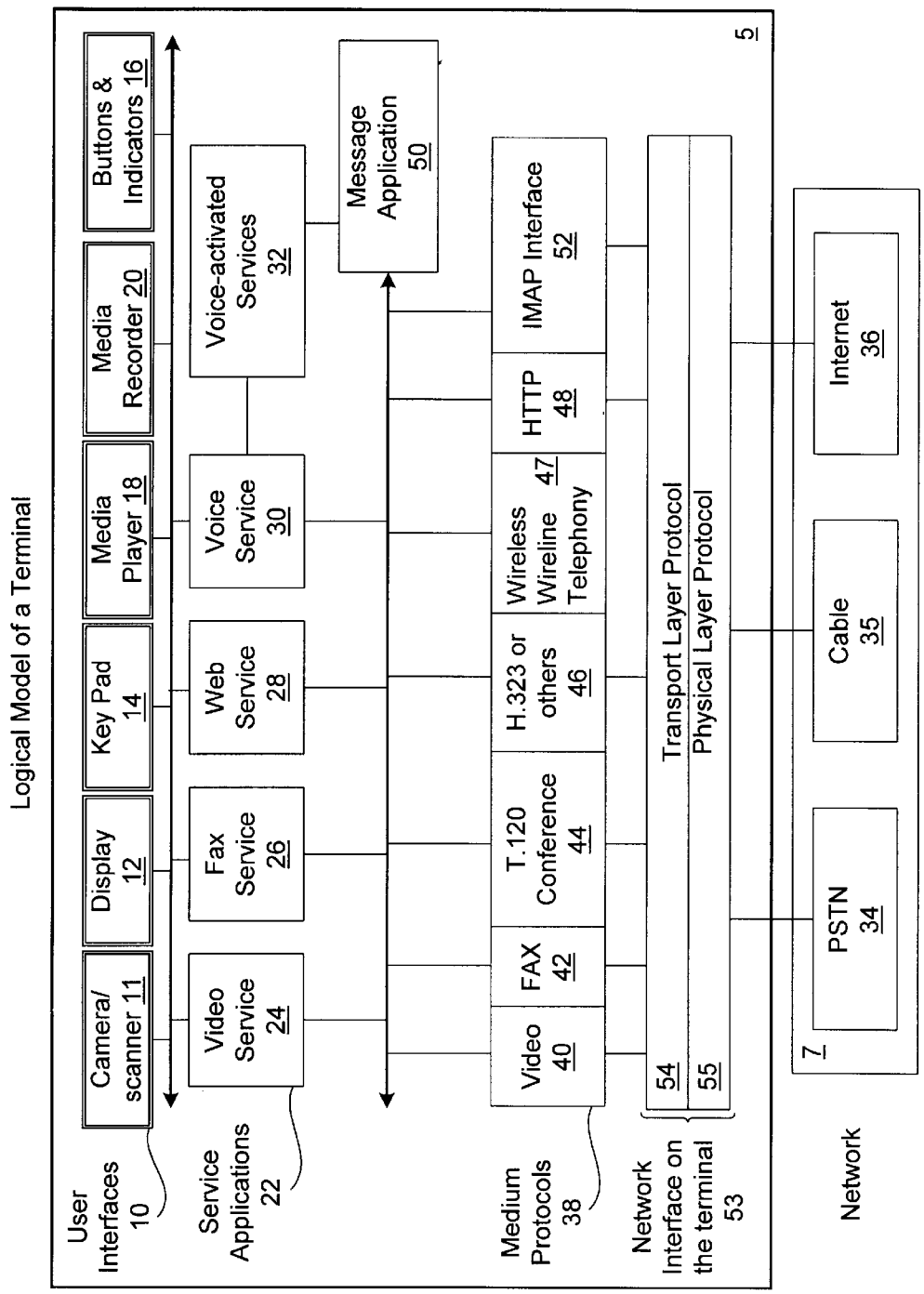
FIG. 1 is a logical block diagram of a terminal as it would be viewed by a multimedia call signalling system according to an embodiment of the invention.

FIG. 1 is a logical block diagram which includes basically all the user interface and functional blocks that might be accessible to a particular user. It is intended to be a some-what comprehensive view of all the ways a user might be capable of communicating. In reality, a particular user would typically have access only to a subset of the functionality illustrated in FIG. 1. The user equipment is generally indicated by 5, and the network is generally indicated by 7. The user equipment 5 includes various user interface components generally indicated by 10 such as a camera/scanner 11, display 12, keypad 14, buttons and indicators 16, media player 18, and media recorder 20. These are each connected to one or more service applications generally indicated by 22 which include a video service 24, a fax service 26, a web service 28, and a voice service 30. Each of the service applications 22 has access to the user interface components 10 as required. The voice service 30 is also interfaced with a voice-activated services service application 32.

Each of the service applications 22 is interfaced to the network 7 through a respective medium protocol generally indicated by 38. The network 7 may include a number of different network types, such as a PSTN (public switched telephone network) 34, a cable network 35, and the Internet 36. The medium protocols 38 include video 40, fax 42, T.120 conferencing 44, H.323 46, wireless/wireline telephony 47, HTTP (hyper-text transport protocol) 48, and IMAP (Internet Mail Access Protocol) 52. The interfaces between the network 7 and the terminal 5 are generally indicated by 53 and include a transport layer protocol 54 and a physical layer protocol 55. The transport layer protocol 54 provides an application independent transport mechanism. FIG. 1 has been simplified to collapse the ISO's Session Layer, Network Layer, Transport Layer and Link Layer to just the Transport Layer. While FIG. 1 is intended to be more or less comprehensive regarding what capabilities a user's equipment might possess, it is to be understood that a user may indeed have additional equipment for interfacing with the PSTN, cable, the Internet, or some other network, and this equipment may be used in the context of the invention as well. The equipment of FIG. 1 may reside on a number of different terminals such as a video terminal, a fax machine, a WWW connected computer, a wireline terminal, wireless terminal, or an H.323 terminal. Furthermore, the view of FIG. 1 is a logical one, so actual components would likely be physically connected differently.

Figure 2A:
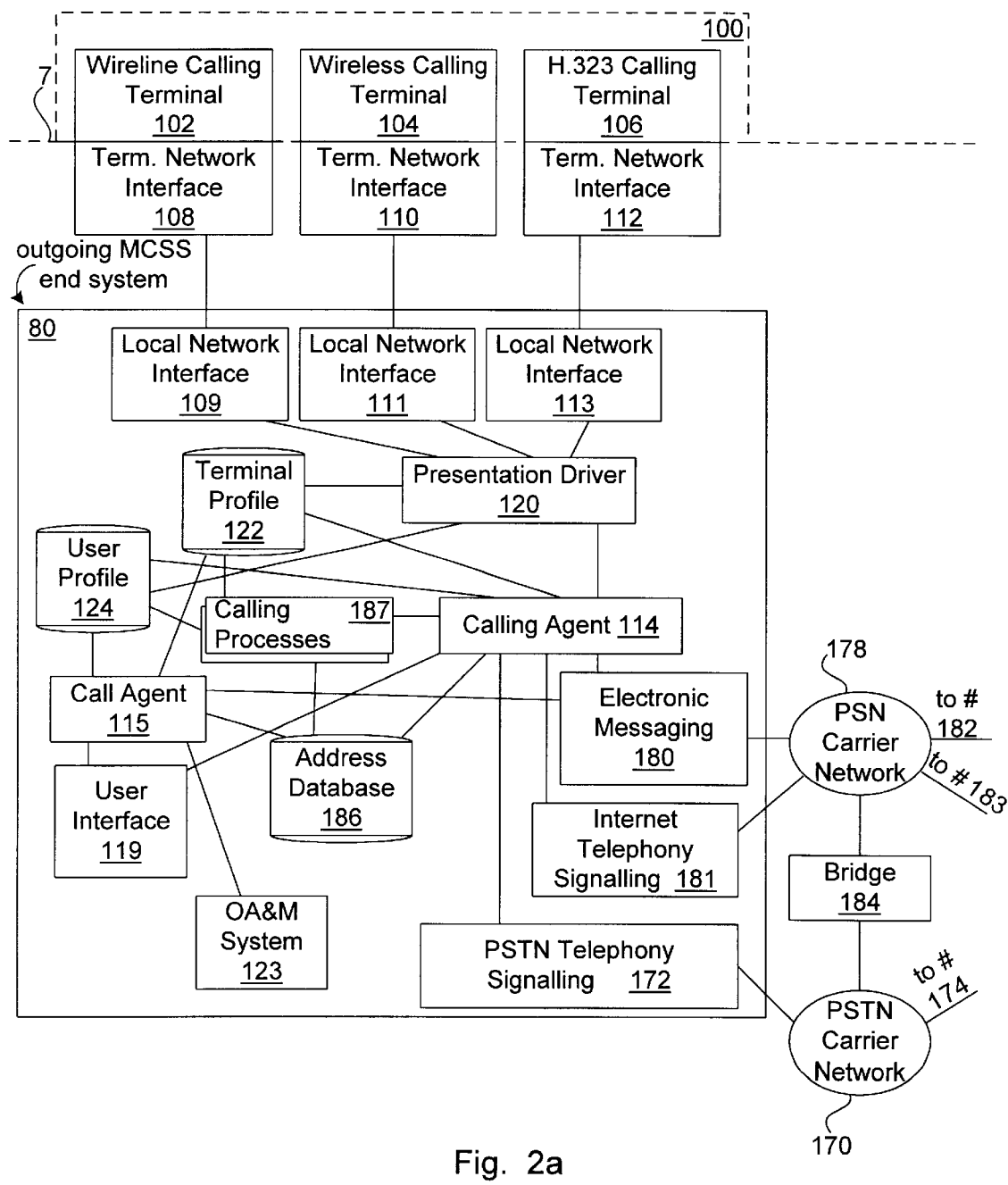
FIG. 2 is an abstract model of a multimedia call signalling system according to an embodiment of the invention.
Figure 2B:
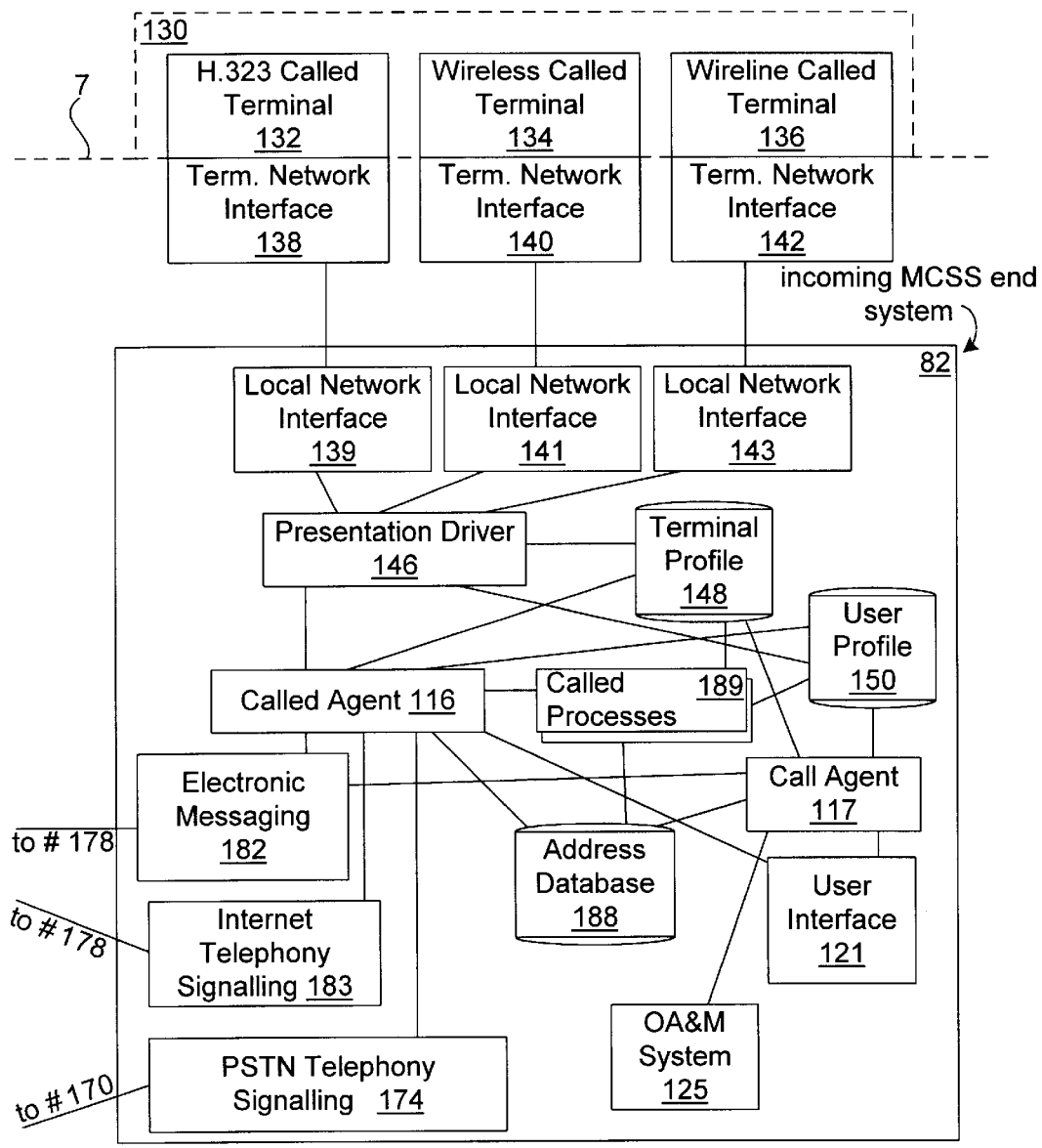

An abstract view of a multimedia call signalling system (MCSS) according to an embodiment of the invention is shown in FIG. 2. Whenever any connection is to be made there will always be a caller having a calling terminal and a callee having a called terminal. In FIG. 2, the caller's user equipment (5 in FIG. 1) is generally indicated by 100 and includes various types of terminal including a wireline terminal 102, a wireless terminal 104, and an H.323 terminal 106. The communications network is again generally indicated by 7. The network 7 includes an outgoing MCSS end system 80 and an incoming MCSS end system 82. The outgoing MCSS end system 80 is the portion of the MCSS involved with handling an outgoing call, and this cooperates with the incoming MCSS end system 82 which is the portion of the MCSS which handles an incoming call request. In the example of FIG. 2, there are two MCSS end systems 80,82, the outgoing MCSS end system handling outgoing call requests, and the incoming MCSS end system handling incoming call requests received from the first MCSS end system. A completely equipped MCSS end system would be equipped to handle both incoming call requests from other end systems and outgoing call requests to other end systems, and thus to fulfil the roles of both an outgoing MCSS end system and an incoming MCSS end system. A connection which is established by such an MCSS end system while acting upon an outgoing call request may be referred to as an outgoing connection, and a connection which is established by such an MCSS end system while acting on an incoming call request may be referred to as an incoming connection. In this abstract view, this network includes various subnetworks required to provide communications links to the caller's terminals. These are identified further below. Each of the caller's terminals 102,104,106 are connected the relevant portion of the network through a respective terminal network interface 108,110,112. The H.323 terminal 106 may be connected to the network 7 through a dial-up link using Point to Point Protocol (PPP) via a modem, directly connected to the network over Ethernet, connected through IP over ATM or IP over cable modem. The terminal network interface 108 for the wireline terminal 102 will be a twisted pair connecting the terminal to a captive office or a public branch exchange (PBX). For the wireless terminal 104, the terminal network interface 110 will be the wireless link which connects the wireless terminal to a ground station.

The MCSS is implemented in large part by a class of entities which will be referred to herein as Call Setup Agents. There are three types of Call Setup agents which are used, and these will be referred to as Calling Agents, Called Agents, and Call Agents. An outgoing call is handled by a Calling Agent 114, and an incoming call is handled by a Called Agent 116. Each MCSS end system 80,82 has a respective Call Agent 115,117 which acts as an interface to the MCSS from telephone company OA&M systems 123, 125 and from users through respective user interfaces 119, 121. Each of these agents are described in detail below. For the purpose of this example, it is assumed that the Calling Agent 114 spawns a Calling Process 187 to handle each outgoing call and that the Called Agent 116 spawns a Called Process 189 to handle each incoming call.

The terminal network interfaces 108,110,112 for calling terminals 102,104,106 are connected to the Calling Agent 114 through respective local network interfaces 109,111,113 and a calling presentation driver 120.

The presentation driver 120 is responsible for exchanging data between the Calling Agent 114 and an appropriate one of the local network interfaces 109,111,113 (and subsequently with the appropriate terminal).

Each of the local network interfaces 109,111,113 may be considered a CIP (call intercept point), or a point where call signalling is intercepted and diverted from its conventional flow and converted to signals according to the MCSS provided by this embodiment of the invention. The local network interfaces have physical layer protocols which provide the physical interfaces to the network. Some examples include Ethernet, Point to Point Protocol, SLIP protocol, ATM, Frame Relay, analog signalling for POTS, ISDN Basic Rate Interface physical layer, TV Cable, and CDMA for Wireless Networks.

The calling presentation driver 120 has access to a terminal profile database 122 which contains information on the user's terminals 102,104,106 and to a user profile database 124 which contains information on the user per se. The terminal profile for a selected one of terminals 102,104, 106 is consulted by the presentation driver 120 to decide what type of conversion is required if any, in passing data to and from the selected one of the subscriber terminals 102, 104,106.

The callee's user equipment (5 in FIG. 1) is generally indicated by 130 and is basically identical to the caller's user equipment 100. Again there are three terminals 132,134,136 connected through respective terminal network interfaces 138,140,142, to the incoming MCSS end system 82 through a respective local network interface 139,141,143, a called presentation driver 146 and the previously identified Called Agent 116.

The called presentation driver 146 for the Called Agent 116 has access to a terminal profile database 148 which contains information on the called user's terminals, and has access to a user profile database 150. The terminal profile database 148 will be consulted for a terminal profile for a selected one of terminals 132,134,136 to decide what type of conversion if any is required in passing data to and from the selected terminal during call setup.

The presentation drivers 120,146 are also responsible for the presentation and routing of the call to the callee's current terminal which may be on a different calling medium that the calling terminal. This is a function of signalling the callee's current terminal using the appropriate local network interface depending on the current terminal of the user. The choice of terminal is not made by the presentation driver. Rather, it is made by the Called Agent 116. The presentation drivers 120,146, must execute any required signalling conversions from one calling medium to another.

The presentation drivers use the terminal profile to decide what kind of conversion is needed. When a call is established, there are one or more connections (call streams). Each stream carries one type of data, for example voice, video, graphic, or data. The presentation drivers will convert data and route it to the appropriate local network interface. For example, a POTS-to-POTS call will always route through a line card. For video signals from a video-on-demand call, the data will be routed to a co-axial cable. As discussed below, during call setup negotiation, a medium for use in establishing a connection is determined. The medium will require a particular transmission protocol which may differ from that expected or generated by either or both of the calling terminal and the user's current terminal. The calling presentation driver 120 must perform a receive type conversion on signals received over the connection from the transmission protocol to the calling terminal's native signalling protocol if these protocols differ, and must similarly perform a transmit type conversion on signals to be transmitted over the connection from the calling terminal's native signalling protocol to the transmission protocol if these protocols differ. Similarly, the called presentation driver 146 must perform a receive type conversion on signals received over the connection from the transmission protocol to the callee's current terminal's native signalling protocol if these protocols differ, and must perform a transmit type conversion on signals to be transmitted over the connection from the current terminal's native signalling protocol to the transmission protocol if these protocols differ.

The presentation driver may, for example, perform codec conversion to convert between different codecs used by two different terminals. For example, one end of the call may be a POTS terminal, the codec used is 64 KPCM (64 Kilobit Pulse Code Modulation) in order to drive a PSTN line card while the other end may be an H.323 terminal that uses a G.723.1 codec. In this case the presentation driver has to convert the G.723.1 codec to the 64 KPCM voice data format to deliver any voice attachment associated with the call setup.

When graphic data is exchanged, the terminal may not be able to support a certain format of graphics and so the calling/Called Agent will instruct the respective presentation driver to convert to the appropriate format. A fax signal is a form of graphic format. The fax machine is a terminal which may not support a specific type of encoding. The presentation driver may have to convert it to an encoding method acceptable go the fax machine.

In some case, a JPEG picture may be sent to a fax machine, and in this case the presentation driver may be configured to convert the data to a format accepted by the fax machine.

Video has many different formats. Most of the time a terminal would have various different software capable of handle various video formats. In some situations the terminal will not accept certain video formats. Video conversion is needed when no capable software is available. For example a terminal might only be able to play MPEG 1 (Motion Picture Expert Group standard) video in a situation where only MPEG 4 video is sent. Rather than reject the call, if the customer has subscribed to the conversion feature, the presentation driver can perform the conversion from MPEG 4 to MPEG 1.

Video conversion is also needed when no compatible hardware is available. For example, when an MPEG video is requested to be send out to a TV via cable, the data signal is not compatible. The presentation driver may be configured to convert from the MPEG video to the cable signal.

A third video conversion scenario involves rate adaptation. If the link in 28.8K baud, and the encoded data rate for a video stream broadcast is 56K baud, the presentation driver will convert the signal format suitable for 56K data rate is 28.8 data rate. Sometimes this conversion may require a format change, e.g. from MPEG to VxTreme.

Text may have to be converted from one encoding scheme to another. For example, ASCII (American Standard Code for Information Inter-exchange) text may be converted to ISO Unicode and vice versa. For a terminal, which has no display, the text data can be converted to speech.

Referring again to FIG. 2, each of the Calling Agent 114 and Called Agent 116 are connected to a PSTN carrier network 170 forming part of network 7 through a respective telephony signalling component 172,174. Similarly, they are each connected to a PSN (packet switching network) carrier network 178 forming part of network 7 through a respective electronic messaging interface 180,182 (or E-mail server) and through a respective Internet telephony signalling components 181,183. The electronic messaging interfaces 180, 182 are preferably mail servers and will be referred to as such in what follows, and more preferably are MIME E-mail servers. The PSTN carrier network 170 and the PSN carrier network 178 may be connected to each other through a bridge 184. The PSN carrier network 178 is any traditional Data Network and, for example might be ATM, Internet or Frame Relay.

The mail servers 180,182 are used to send E-mail from the Calling Agent 114 to the Called Agent 116. They also assume the responsibility of delivering reply mail from the Called Agent 116 to the Calling Agent 114. These servers preferably have the functionality of conventional mail servers in addition to some extra processing functions for realizing the MCSS. When the Calling/Called Agent 114,116 starts up, it will register with the respective mail server 180,182. When one of the mail servers 180,182 receives an E-mail, it will strip the header and pass the contents to the Calling Agent 116 or Called Agent 114.

The mail servers 114,116 preferably take advantage of a conventional mail server's features which include:

1. Address resolution;
2. Universal support around different networks;
3. Store and forward technology that can provide a reasonably safe delivery transport layer;
4. Message storage server which manages the messages;
5. Provides notification service from the network; and
6. Wide support to access the contents.

Preferably the mail servers 180,182 use the MIME (Multipurpose Internet Mail Extension) format, and this will be assumed in what follows. It is to be understood that while MIME encoding is the most convenient presently known mechanism for formatting the information to be included in the various electronic messages, other encoding and formatting techniques may be used, as appropriate. It is further to be understood that the mail servers 180,182 can be replaced by any reliable electronic message transport mechanism which provides the same or similar function. For example, each mail account could be replaced by a URL (universal resource locator) in which case the electronic messages would be delivered to the Called Agent on a web server of the designated URL embedded in a web page. As another example, a direct TCP/IP connection could be used to transfer the message between the Calling Agent and the Called Agent. In this case, the electronic address of the Calling Agent would be a combination of a TCP/IP address and a service port number of the TCP/IP connection.

The PSTN signalling components 172,174 handle the PSTN telephony protocols such as ISDN Primary Rate, ISDN basic rate or Common Channel Signalling Number 7. Other per trunk signalling is also supported by these components. Their main function is to complete a PSTN call connection at the last phase of a call setup. The PSTN signalling components 172,174 are different from the PSTN local network interfaces 109,111. The PSTN local network interfaces 109,111 intercept calls from the wireline, wireless terminals 102,104 and pass them to the presentation driver 120, whereas the telephony signalling components 172,174 are involved with the actual connection of a call after it has been intercepted, and a decision has been made to connect it over the PSTN carrier network 170.

The Internet signalling components 181,183 handle Internet call connection at the last phase of a call setup. These are usually H.323 Gatekeepers. This Gatekeeper is different from the Call Interception Point Gatekeeper which exists in the local network interface 113 for the H.323 terminal 106. The Gatekeeper in the local network interface 113 intercepts call requests from the H.323 terminal and passes them to the Presentation driver 120, whereas the Gatekeeper in the Internet signalling components 181,183 are involved with the actual connection of a call after it has been intercepted and a decision has been made to connect it over the PSN carrier network 178.

The bridge 184 links the PSTN 170 and PSN 178 together. It is usually called the Voice over IP Gateway. This gateway provides three major functions:

1. Signalling conversion—During the call setup phase, the call setup signalling protocol from one type of network is converted to another.
2. Directory services—The directory system for the PSTN and PSN does not have to be the same. If the PSN is ATM or X.25 it can be using the E.164 numbering scheme, and there is still the requirement to do a conversion between the letter, region and captive office.
3. Voice transcoding—The codec for the Wireline is 64 KPCM, the coded for Wireless can be a different type of CELPS (code excited linear prediction) and the Internet can be G.721 or G.723. In order to relay the voice signal between the PSN and PSTN, the codec has to be changed form one format to another.

Each of the Calling Agent 114 and the Called Agent 116 are also connected to a respective address database 186,188 containing a translation between user identifiers and corresponding E-mail addresses as described in detail below. While shown as two logical entities, the address databases 186,188 may consist of one or more actual databases. Furthermore, the E-mail addresses may be replaced by any electronic address used by an appropriate message deliver transport mechanism.

The Calling Agent 114 and the Called Agent 116 are software entities each associated with (logically connected to) mail servers 180,182. They are activated to process the E-mail messages when these are received by the associated mail server. The mechanism which the mail servers use to trigger the activation of the Calling and Called Agents 114,116 is an application class identified in the application class tag forming part of the E-mail message body in MIME format defined by this embodiment of the invention.

The Calling Agent 114 is the entity which handles outgoing calls. The main functions of the Calling Agent 114 is to:

1. perform an E-mail address resolution from the called number or Internet address (fully resolved address or alias) requested by the caller;
2. create a unique reference identification for each outgoing call;
3. construct an E-mail to be sent to the Called Agent 116;
4. process the negotiation of call setup parameters; and
5. participate in the initiation of the establishment of the real call connection after the callee terminal address and the call medium is received and settled through the negotiation process.

It should be noted that through the address resolution using the information from the address database 186, the call can be setup on behalf of other devices rather than for the terminal from which the user initiated the request. This type of request would be constructed through an appropriate user interface 119. For example, a user can use the system to set up a call between the cable company and his/her cable reception box for a movie on demand. The Calling Agent 114 will recognize the type of call, movie on demand and engage in a dialog to prompt for more information on what movie is requested. The Calling Agent 114 will include the information in a mail message as part of a call data parameter using a CALL_DATA option and will send the message to the cable company's Called Agent. When the cable company's Called Agent 116 receives the request, it can reply with an acceptance mail and initiate the downloading of the movie either through multicast or by injecting the video to the cable co-axial circuit connected to the user.

Every customer will have a Calling Agent 114 to perform the outgoing call function. The actual implementation can be done by a process, a thread or a single process action on data structures which represent the Calling Agent 114. Because the Calling Agent 114 is not necessarily active 100% of the time, and may be event driven, it is more complicated to implement the Calling Agent other than by using the separate process or thread technique.

Figure 5A:
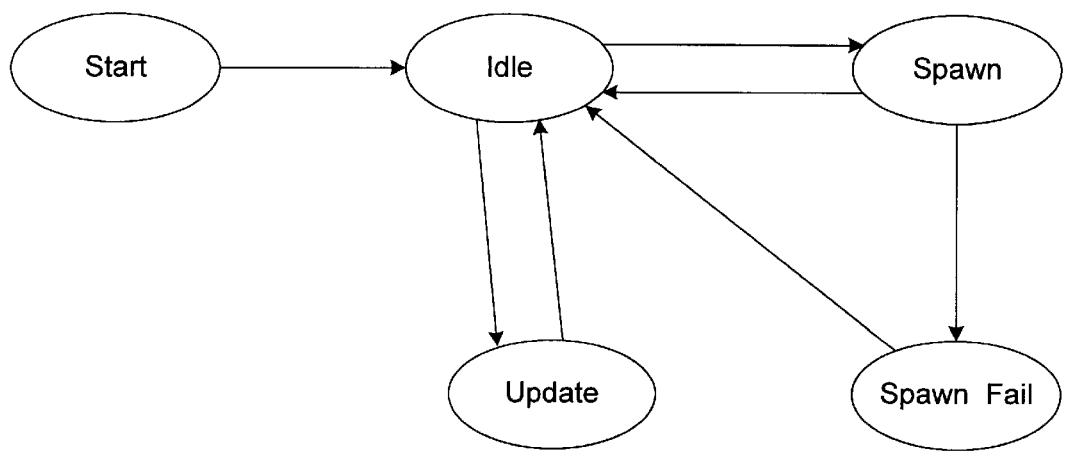
FIGS. 5a–5d are state diagrams for a Calling Agent, calling process, Called Agent and called process.

FIG. 5a is a state diagram for the Calling Agent 114. Each user has one Calling Agent 114 to handle the outgoing call. Once it is started, it may create clones of itself to handle multiple calls from one or different terminals from the same user. In this example, it is assumed that the Calling Agent 114 spawns a Calling Process 187 to handle each call. The state transitions for the Calling Agent 114 are defined in the following table:

| State | Transition Condition | New State |
| --- | --- | --- |
| Start | Succeed on initialization and register with the Signalling Components using the user's account | Idle |
| Idle | When a call request is received | Spawn |
| Spawn | Successfully spawn a calling process to process the call | Idle |
| Spawn | Failed to spawn a calling process | Spawn Failed |
| Spawn Failed | Send reject request to the user | Idle |
| Idle | Received Reply | Update |
| Update | Relayed the information to the Calling Process | Idle |

State descriptions:

| State | Description |
| --- | --- |
| Idle | Initial state |
| Spawn | Spawn a Calling Process |
| Spawn Failed | Recover after the spawn failed |
| Update | Relayed the call related information to the Calling Process |

Figure 5B:
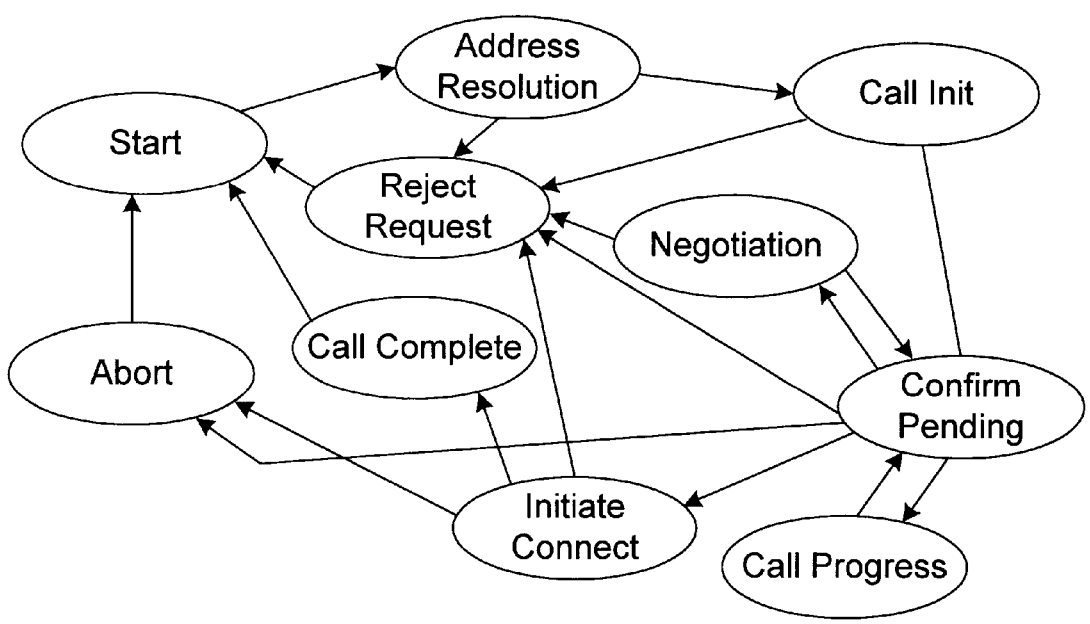

The Calling Process 187 is an execution thread or a process to handle the outgoing call. Its main design objective is to allow multiple calls to be performed simultaneously so as to handle multiple call streams from one or multiple terminals. If multiple calls are initiated from the same terminal at the same time, only one Calling Process is used because the processing is still sequential. However in the actual detailed implementation, each call from the same terminal in a multiple call request can be handled by one of multiple threads or by sub-processes of the Calling Process to simplify the processing. Each thread or sub-process is associated with the Calling Process using the call reference specified in each call specification in the mail message. The Calling Process does not interface with the mail servers directly. Rather, it constructs the MIME message and requests the Calling Agent to initiate the delivery of the message. Using this design allows the Calling Process to be independent of the message deliver transport mechanism. The states and transitions of the Calling Process are illustrated in FIG. 5b.

The state transitions for the Calling Process are defined in the following table:

| Initial State | Transition Condition | New State |
| --- | --- | --- |
| Start | Upon receiving the call request from the Calling Agent | Address Resolution |
| Address Resolution | Successfully maps the Directory Number or IP address/alias to an E-mail address | Call Init |
| Address Resolution | Failed to map the Directory Number or IP to an E-mail address | Reject Request |
| Call Init | Successfully construct the MIME message and send the E-mail | Confirm Pending |
| Call Init | Failed to construct the MIME or failed to send the E-mail | Reject Request |
| Confirm Pending | Receives a call progress reply | Call Progress |
| Call Progress | Inform the user on call progress | Confirm Pending |
| Confirm Pending | Receive negotiation reply | Negotiation |
| Negotiation | Send negotiation reply | Confirm Pending |
| Negotiation | Failed to send the reply | Reject Request |
| Confirm Pending | Receive call accept reply | Initiate Connect |
| Confirm Pending | Receive disconnect reply | Reject Request |
| Initiate Connect | Initiate the call connection with success | Call Complete |
| Call Complete | Inform the Calling Agent on the completion status | Start |
| Initiate Connect | Failed to establish the call using PSTN signalling or Internet signalling | Reject Request |
| All States | Receive disconnect reply | Start |
| Confirm Pending | Receive connect abort request from the Calling Agent | Abort |
| Initiate Connect | Receive connect abort request from the Calling Agent | Abort |
| Abort | Send disconnect request to Called Agent | Start |
| Reject Request | Inform user that the call request is rejected and clean up | Start |

The Called Agent 116 processes the incoming call request in the mail message. It is activated by the associated mail server 182 when an E-mail is received. The application class tag in the E-mail is selected so as to be associated with the Called Agent software. In conventional mail systems when the mail server receives an E-mail, a user is notified. In this case however it is the Called Agent 116 which is informed. The Called Agent 116 may be implemented as mail client software. Every customer will have a Called Agent 116 waiting for any incoming call. Once the mail server 182 receives the incoming mail for the Called Agent 116, the Called Agent is notified and the E-mail is passed to the Called Agent which will extract the call information.

The implementation of the Called Agent 116 should support call parallelism. In a PSTN world, users usually need to setup one call from one to another. But with multi-media, multiple calls may be needed to support audio, video, text messaging, fax transfer or file transfer from one user to another users simultaneously. Therefore, parallelism is vital to the success of a multi-media telephony system. The implementation of the Called Agent 116 will be parallel to the above described implementation of the Calling Agent 114. It spawns a Called Process 189 to process the call request. This will simplify the design of the Called Agent 116.

Figure 5C:
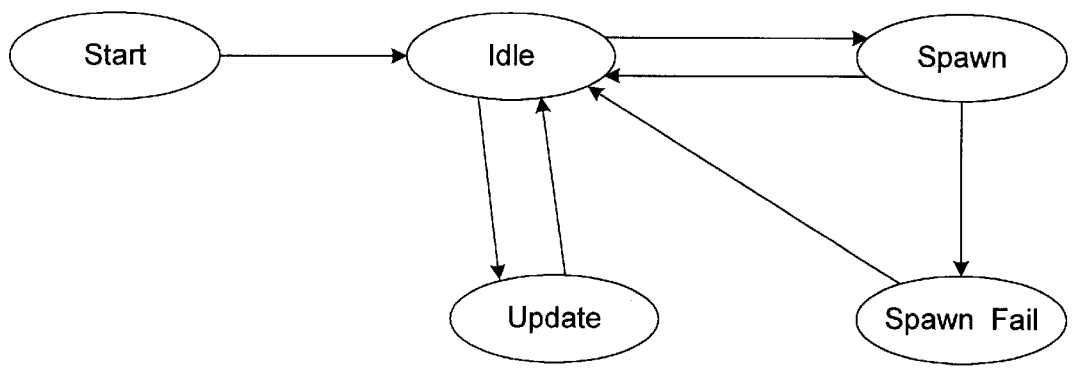

The functions of the Called Agent 116 extracting the call setup request information from received mail messages, spawning a Called Process 189 to execute the call setup request, and extract the call setup reply information and pass this to the Called Process. A state diagram for a Called Agent 116 is shown in FIG. 5c. The state transitions for the Called Agent 116 are defined in the following table:

| State | Transition Condition | New State |
| --- | --- | --- |
| Start | Complete Initialization | Idle |
| Idle | Call request received | Spawn |
| Spawn | Created a Called Process successfully | Idle |
| Spawn | Failed to create a Called Process | Spawn Fail |
| Spawn Fail | Reported error | Idle |
| Idle | Received Reply | Update |
| Update | Inform Called Process | Idle |

A Called Process 189 is an execution thread or a process which will serve the call setup. It does not interface with the mail server. Rather it gets information from the Called Agent. Therefore, the Called Process can work with other mechanisms which deliver the call setup request and call reply messages in MIME format.

The Called Process uses the User Profile Database 188 to find the current terminal which the callee is working on. If the current terminal can terminate the call, the Called Process can construct a reply mail message to accept the call.

It can also use information in the User Profile to perform call filtering, for example, to reject calls from a particular user or to only accept calls from a list of explicitly specified people.

Figure 5D:
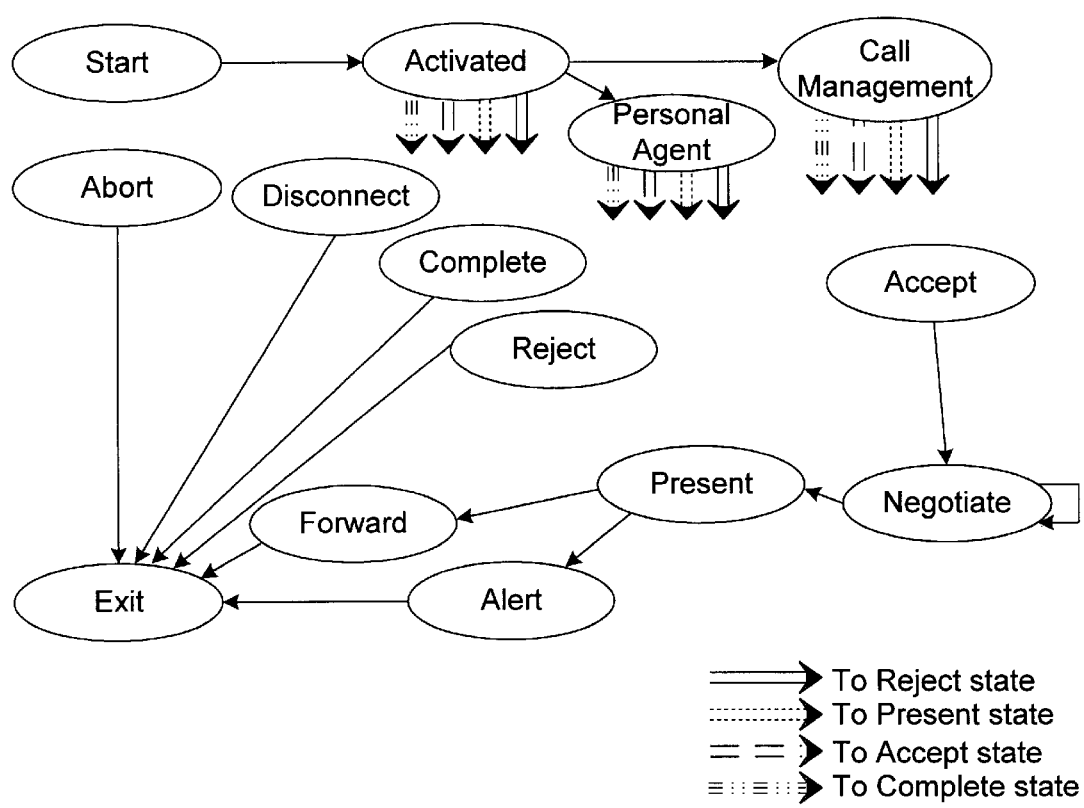

A state diagram for a Called Process is shown in FIG. 5d. The state transitions for a Called Process are defined in the following table:

| State | Transition Condition | New State |
| --- | --- | --- |
| Start | Received the call setup request | Activated |
| Activated | User profile requires call hand over to Call Management | Call Management |
| Activated | User profile requires call hand over to Personal Agent | Personal Agent |
| Call Management | Call is accepted but requires negotiation | Accept |
| Call Management | All information is received, Call can be presented to the user. | Present |
| Call Management | Call is rejected. | Reject |
| Call Management | Call is completed and no more call setup is needed | Complete |
| Personal Agent | Call is accepted | Accept |
| Personal Agent | All information is received. Call can be presented to the user | Present |
| Personal Agent | Call is rejected. | Reject |
| Personal Agent | Call is completed and no more call setup needed | Complete |
| Activated | Call is accepted | Accept |
| Activated | All information is received. Call can be presented to the user | Present |
| Activated | Call is rejected | Reject |
| Activated | Call is complete and no more call setup is needed | Complete |
| Accept | Require parameter negotiation | Negotiate |
| Negotiate | Receive a negotiate reply | Negotiate |
| Negotiate | Parameter match | Present |
| Present | Successfully offered to the terminal | Alert |
| Present | Failed to offer the call | Reject |
| Alert | Send Alert call progress reply to Calling Agent | Complete |
| Alert | Connection timed out and call forward option is available | Forward |
| Forward | Send Forward call progress reply and forward the mail message | Exit |
| Reject | Send Reject call progress reply to Calling Agent | Exit |
| Disconnect | Send clean up message | Exit |
| Complete | Send Disconnect reply to Calling Agent | Exit |
| All States | Upon receiving a Disconnect from the Caller | Exit |
| All States | Upon received an abort request | Abort |
| Abort | Send Disconnect to Caller | Exit |

The states in the Called Process state transition diagram of FIG. 5d are described in the following table:

| State | Description |
| --- | --- |
| Start | Initial state of the process |
| Active | The beginning state of handling the call |
| Call Management | When the call is handed off to the Call Management System, the Called Process remains in this state until the call is returned from the Call Management System |
| Personal Agent | When the call is handed off to the Personal Agent System, the Called Process remains in this state until the call is returned from the Personal Agent System |
| Accept | The call can be processed to either be presented to the caller or for negotiation |
| Negotiate | The call enters the parameter negotiation process |
| Present | The call is presented to the caller's terminal |
| Alert | The terminal is ringing and the Called Process has informed the Called Agent that the caller's terminal is ringing |
| Forward | The call is forwarded to another Called Agent |
| Reject | The call is rejected due to various reasons |
| Disconnect | The call will not be connected. The Calling Agent will be instructed to disconnect the call |
| Complete | The call has been established |
| Abort | The call has to be abruptly terminated |

In the description which follows, the distinction between the Calling Agent and the Calling Processes which it spawns is largely ignored for the sake of simplicity, and a similar simplification is made for the Called Agent and the Called Processes.

The Call Agents 115,117 are the entities which handles interactions and interfaces with the address database, terminal profile and user profile. They also handles the management of the Calling Agent and the Called Agent. User or Telephony OA&M systems interact with the Call Agent to maintain the profiles. The following are the functions of the Call Agent:

1. Interface with the Telephony company's Operation, Administration, Maintenance and Provisioning system (OAM&P) to configure and maintain the user profile and terminal profile;
2. Collect calling detail records (CDR), operation measurements (OM) and logs from the Calling Agent and Called Agent;
3. Provide the CDR, OM and logs to the Telephone company's OA&M system;

4. Accept change of terminal request from the user and update the user profile;

5. Responsible for the startup and restart of the user's Calling Agent and Called Agent; and 6. Access the mail account for the user to retrieve call information. If the user would like to review how many call have been received today, the number of call setup request E-mails can be retrieved and presented to the user. These E-mail records are like caller ID records on a Caller ID Display device.

ADDRESS DATABASE

A major principle used by this invention is address translation which may be implemented as a form of directory look-up. This invention introduces new procedures into the address translation process used by the CO and the Gatekeeper and rather than using the native signalling protocol to complete the phone call, an additional layer of signalling protocol is introduced to allow the far end to handle the call indifferently for a wireline, wireless, and Internet phone. This new protocol does not replace the conventional telephony protocol but adds an additional layer to provide proper coupling between different telephone networks. More particularly, call setup signalling is performed through E-mail communication between the Calling Agent 114 and the Called Agent 116. Once the type and medium for the call have been established, the conventional telephony signalling components 172,174 and/or in the Internet signalling components 181,183 are used to complete the connection.

For a given user, there will be one or more user identifiers. Each user has a one or more separate user identifiers for each type of network identifier for which the user has terminals. For example, if the user has a wireline terminal and a wireless terminal, both of these terminals will have an E.164 type network identifier, and can together be represented by a single user identifier which also in E.164 format. If the user has an H.323 terminal, then the user would have a user identifier which is an H.323 Internet address. The purpose of the user identifier is to provide keys into the address database 186 which contains a mapping from user identifiers to MCSS Called Agent E-mail addresses. For each user of the MCSS provided by this embodiment of the invention, there will be a single unique designated Called Agent having a unique E-mail address. Thus, for a user having a E.164 user identifier and an H.323 Internet address user identifier, the address database 186 will contain a translation from the E.164 user identifier to the Called Agent E-mail address, and a translation from the H.323 Internet address user identifier to the Called Agent E-mail address. It is not necessary that the user identifiers correspond with actual addresses of the user's terminals. The requirement for a different user identifier for each network type stems from the fact that a call setup request from an H.323 terminal must include an H.323 address, and similarly, a call setup from an E.164 based terminal must include an E.164 terminal address.

In addition to this translation information, for each user identifier there will be an identification of the types of call media supported by the associated terminals. It may also include a quality of service capability of the terminals. If a call setup request is received demanding a quality beyond the capability of the destination terminals, this can be identified. There may also be a pointer to a system or application which is to process the call setup request for the particular terminals. When a call is to be connected through to one of the terminals, the application is activated.

This address database may be implemented using LDAP (lightweight directory access protocol) or X.500 directory services for example, depending upon the design of the network.

TERMINAL PROFILE

The terminal profile database 122 contains a terminal profile for each terminal owned by a user and which has been registered with the MCSS. When a terminal is being used which is not one of a user's registered terminals there will be no terminal profile for that terminal. In this case, a canned terminal profile can be generated dynamically based on any information available. Each terminal profile has a reference which can be a string or a number, but which is preferably selectable by the user. Preferably, aliases may be used which allow users to identify their terminals using names they have personally selected.

The terminal profile for a given terminal includes the following information:

Network identifier—the terminal identifier of the terminal within its native network. For an H.323 using a dial-up service, the terminal identifier is an IP address which is updated by the Gatekeeper after the customer has registered (i.e. signed on);

Terminal Type—Terminal type describes the type of terminal. It can be a wireline, wireless or H.323 terminal for example;

Terminal Capability—This is a list of capabilities which the terminal can perform;

Subscribed Services—This is a list of subscribed services associated with this terminal. This permits a user to subscribe to different services on different terminals, and thus to differentiate the cost of ownership of each terminal.

USER PROFILE

The user profile database 124 contains a user profile for each user. The user profile contains the vital data of the user including the user's current terminal. More specifically, it preferably includes the following for each user:

Legal and Billing Information—This contains the name, and the address for the user's account;

Mail Account—This is the name of the mail account associated with the user. This account is used to send and receive E-mail for call setup or call termination, and is not visible to the user. This account has a unique name designed by the provider of the MCSS;

User Account—This is an identifier of the user's account which the user uses to identify himself/herself to the system as a form of authentication when using the MCSS from a terminal which is not a registered terminal. It is preferably an alphanumeric and non-case sensitive string so that the name can be entered using a telephone keypad;

User Password—This is used together with the User Account to access the system to change the user profile or setup a call from a terminal. The password is preferably alphanumeric such that it can be entered through a telephone keypad. For advanced systems, the password may be entered through speech recognition technology;

Private key—This key is needed for non-secured access such as Internet access to permit deciphering a password from a terminal which has encryption capability. The terminal will encrypt the password using a public key. The private key is not available to the user for security reasons. The private key is assigned by the signalling system provider;

Subscribed Services—This describes non-terminal related services to which the user has subscribed. This entry contains information on what services are subscribed to on every terminal using the MCSS. Examples are a personal agent service which permits call filtering or screening, and unified messaging which provides access to a mail server;

Current Terminal—This points to the current terminal associated with the user. The current terminal is only allowed to be one of the predefined set of terminals for which terminal profiles exist or can be created dynamically;

Current Call Management—This points to a current call management description. Call management features are offered by the existing telephone company such as a list of terminal numbers which can be activated by name dialling, customized announcements for specific calling IDs, offering calling information to the user with the option to reject the call, answer with a recorded message, or return a busy signal;

Quality of Service—This determines the grade of service subscribed to by the user. The user can request automatic PSTN to Voice Over IP gateway for long distance using a specific codec, for example. Some codecs require less bandwidth which can be more adaptive to Internet delay. The quality of service may also be used to determine how a terminal call is to be routed. For example, when a call is originated from the PSTN for connection to H.32:3, this option can be used to determine whether a near end gateway or a far end gateway is used. Near end gateway will be cheaper but subject to Internet delay. For end gateway will be higher quality but may result in the requirement of paying distance charges. Alternatively, a call may be setup over an ATM network in a private data network rather than over the global Internet;

Personal agent service—This points to any implementation of a personal agent to which the user has subscribed or has access. When a call setup request is received, the request can involve the personal agent implementation to perform advanced functions such as filtering;

Call Forward Address—This stores a call forward address. This may be a terminal address of a terminal not belonging to the user to which the presentation driver may deliver a call, or a new E-mail address of another Called Agent.

CALL SETUP REQUEST

The first step in setting up any call is a call origination from a calling terminal. This will result in a call setup request in the protocol of the native network of the particular calling terminal. This may be a conventional call setup request which is the same whether or not the MCSS provided by this embodiment of the invention is used. The call setup request is intercepted at the call intercept point, this being the local network interface for the particular calling terminal. The setup request is then passed through the relevant local network interface and the calling presentation driver 120 to the Calling Agent 114. The setup request includes a called user identifier for the called party. Alternatively, the call setup request may be generated trough the user interface 119 which permits a more generalized call setup request to be made.

As described below, the called user identifier is translated by the Called Agent 116 to a terminal identifier for whichever of the user's terminals is the active or presently selected.

E-mail MESSAGE STRUCTURE AND CONTENTS

Call setup and call reply E-mail messages are used to perform call setup signalling according to this embodiment of the invention. A call setup message is generated once by the Calling Agent to activate call setup activities. Thereafter, call reply messages are used for the remaining lifetime of the call setup and may be generated by both the Calling Agent and the Called Agent. Each component of a message is referred to as a parameter, and a parameter may itself contain parameters. In the following, the contents of the messages are described hierarchically. Messaging is preferably done using the RFC 1341, 1342, 1522 and 1531 MIME (Multipurpose Internet Mail Extensions) format. The following message formats are defined using BNF's (Backus Naur Forms) but this may not necessarily be the case.

MIME Signalling Message BNF

This is the generic form of any message being used for the MCSS, and applies for both call setup and call reply messages:

<mime-signalling>::=<call-setup>|<call-reply>

In the above, the symbol "|" means that one of the two components it separates is included in the message, i.e. either the <call-setup> component or the <call-reply> component.

CALL SETUP E-mail MESSAGE

In response to a call setup request, the Calling Agent 114 constructs a call setup E-mail message addressed to the E-mail address associated with the called user identifier. This involves filling in the <call-setup> field of the above described generic call signalling E-mail message as follows:

<call-setup>::=<mime-header><callinfo><callinfo>*<mime-data>*

<mime-header>::="MIME-Version:1.0" CRLF

<callinfo>::=<callinfo-header><callinfo-body><options>*
    <attachment>*<callinfo-end>

<callinfo-header>::="application/x-call";<boundary-specification>

<callinfo-body>::=<caller>CRLF<called>CRLF <call-medium>CRLF
    <call-ref>CRLF<call-action>CRLF<quality>

<caller>::="CALLER" SP"("<address>[","<name>]")"

<called>::="CALLEE" SP"("<address>[","<name>]")"

<medium>::="MEDIUM" SP ("VOICE"|"DATA"|"VIDEO"|"FAX")

<reference>::="REFERENCE" SP<reference value>

<quality>::="QUALITY" SP<quality-list>

<options>::="OPTION" SP(option-list)

<attachments>::=<mime data>

<callinfo-end>::="--"<boundary tag>

<address>::=<e.164>|<ip><tcp>|<udp>|<rtp>|<url>| . . .

<e.164>::="(""E164"",""<ITU E.164 phone number specification>")"

<ip>::="("IP"",""<Internet IP address">"

<tcp>:=="TCP"","<Internet IP address>":"<number>

<udp>:=="UDP"","<Internet IP address>":"<number>

<rtp>:=="RTP"","<Internet IP address>":"<number>

<url>:=="URL"","<URL address>

<medium>::="VOICE"|"DATA"|"VIDEO"|"FAX"

<quality-list>::="("<quality-value><quality-value>*")"

<quality-value>::=<grade>|<delay>|<codec-list>

<grade>::="(""GRADE"","
    ("TOLLQUALITY"|"NEARTOLL"|"ACCEPTABLE")")"

<delay>::="(""DELAY"",""<milliseconds>")"

```
<codec-list>::="(""CODEC"",""<codec>("",""<codec>)
    *")"
<codec>::="H.723.1"|"H.729"|"64 KPCM"|"32 KPCM"|
    ...
<option-list>::="("<option-value>("",""<option-value>)
    *")"
<option-value>::=
    "CHARGEBACK"|"CALLBACK"|"RINGBACK_
    WHEN_NOT_BUSY"|...
<call_data_list>:=<call_data_value(SP<call_data_
    value>|NULL)
<call_data_value>:="("<key>"",""<call_data_value>")"
<key>:=any data encoded in a data format acceptable by
    the MIME specification
<value>:=any value encoded in a format acceptable by the
    MIME specification
SP::=(<space>|<verticaltab>|<horizontal tab>|<line
    feed>|
CRLF:=(<carriage return><line feed>)(<carriage
    return><line feed>)*
<space>::=space character
<vertical tab>::=vertical tab character
<horizontal tab>::=horizontal tab character
<line feed>::=line feed character
<carriage return>::=carriage return character
<name>::=any MIME acceptable string or data
```

CALL REPLY E-mail MESSAGE

In response to a call setup message, the Called Agent 116 constructs a call reply E-mail message addressed to the E-mail address associated with the Calling Agent 114. In addition, any further communication for the life of the call setup is done through call reply messages from the Calling Agent 114 to the Called Agent 116 or vice versa.

The reply E-mail content is also encoded in MIME. This involves filling in the <call-reply> field of the above described generic call signalling E-mail message as follows:

```
<call-reply::=<mime-header><reply-body>
<reply-body>::=<reply-tag>"",""<boundary-
    specification>CRLF
    <reply><boundary-tag>
<reply-tag>::="Content-type:application/x-call-reply"
<reply>::=<progress-
    indicator>|<connection>|<negotiation>
<progress-indicator>::=:CALL_OFFER_
    STATUS"SP<non-accept-call-state>
<connection>::="CALL_OFFER_
    STATUS"SP"ACCEPT"CRLF
    <reference>CRLF<progress>CRLF
    (<medium>CRLF)
    (<caller>CRLF<callee>CRLF)
    (<quality>CRLF)*(<option>CRLF)*
    (<attachment>CRLF)*
<non-accept-call-state>::=
    "RINGING"|"FORWARDED"|"COMPLETE"
    "(""DISCONNECTED"",<reason>"")"|
    "(""REJECTED"",<reason>"")"
<negotiation>::="NEGOTIATION"CRLF<callinfo>
```

The reply is also used as a mechanism to provide call progress. It is also used as a call accepting notification. If the Calling Agent wants to terminate the call before the actual call setup is completed, it can also use the reply message to instruct the Called Agent to terminate the call using the <non-accept-call-state> of "DISCONNECTED" with a reason in the <reason> field.

The actual contents of the reason field can be implementation dependent. It may for example be digitized voice (so that the audio clip can be played to the caller) or a text message to inform the caller why the call is rejected. However, MIME allows any data type to be encoded to improve the information density of the communication.

Explanation of the Fields of Call Setup E-mail Messages

The following provides detailed information for all the components in the call setup mail messages. The syntax defined here follows the MIME design methodology. The data format specified here is designed for extensibility to handle new parameters and keywords.

<mime-header>

This is required by the MIME specification to indicate the beginning of the contents of the message;

<boundary-specification>

The boundary specification is used to delimit parts in a MIME. It specifies a unique string which is used to separate one group of data from another. The value of the boundary is defined without the "--" (two minus sign character) in the specification, and at the boundary it is prefixed with two minus characters "--". For example, boundary=eot would define the string "eot" as a boundary. The boundary would then appear as "--eot".

Content-type="application/x-call"

This string is a mechanism to identify the E-mail message as one which is to be processed by the MCSS, and to thereby distinguish it from an E-mail message serving some other purpose. This mechanism is defined in RFC 1341. The keyword "application" indicates the following data is the input to an application. The string following the "/" is the class of application. It is used as a key to map to an application using a ".mime" profile. The prefix of "x-" is used for any application which is not registered with the Internet Assigned Number Authority (IANA). If the MCSS provided by the invention is granted a designation for this class of application, the "x-call" could then be changed to something like "telephony/call".

The information is grouped by a boundary using a boundary specification as discussed above. The information for the call and characteristics are included in the <call info-body> subsection of <call-info> in the MIME.

There may be multiple call <call-info> information units in the MIME message each dealing with a respective connection which needs to be established. The result of this is the creation of multiple calls in a single request between two or multiple terminals. It is assumed that the multiple calls are connected from a first series of one or more terminals associated with the calling party to a second series of one or more terminals associated with the called party. For example, a caller with an ISDN terminal may request two different outgoing connections to a singled or multiple called terminals. Such a multiple call request may be generated through the user interface 199, or directly from the calling terminals if the network interfaces are modified to receive such requests.

<caller>

This is the component containing the caller information. The information is either an ITU E.164 address (esn number) or an Internet address which can be in dot numeric form (e.g. 47.34.5.121) or symbolic form (e.g.ck.pcn.nortel.com). The <name> option of the caller is a feature which supports the Caller ID function. In PSTN networks, this name can be extracted from directories. In the IP world, this would be a name of the originator's choice.

<called>

This is the component for callee information. The information is either an ITU E.164 address (esn number) or an Internet address which can be in dot numeric form (e.g. 47.34.5.121) or symbolic form (e.g. ck.pcn.nortel.com). The address in the <called> field may also be specified by name. This is the equivalent of symbolic dialling. The function of the called directory number in this signalling protocol is only to permit E-mail address resolution for the called party.
<reference>

In order to identify every call setup request, a unique reference identifier is given to the call setup request. When the Called Agent replies, the reference is used to associate the reply with the request.
<medium>

This tag is used to specify the preferred call medium information. The medium of the call that can be established depends on the support of the underlying network(s). The basic types are voice call (like the telephone services offered by Bell) data call (e.g. TCP/IP call for data communication) video call (video image communication) or fax (for facsimile transmission). The call medium is qualified using a keyword. A few keywords are listed here and include VOICE, DATA, VIDEO and FAX. More keywords may be added for additional call media.
<quality>

Quality is the parameter to express what will be the quality of service. It can be as simple as strings of tokens which are bilaterally agreed upon or key-value pairs in strings, e.g. (FRAME_PER_SECOND,10) or a range of values (MODEM_SPEED,300,2400,9600,28800). This parameter is especially important to the H.323 terminals. There is option negotiation built into the H.323 protocol family but it is an optional feature. The negotiation cannot always take place. Therefore, this parameter provides another alternative to perform the negotiation. If negotiation is required, the negotiation is done by sending a call request E-mail, such as described in this section, and the reply E-mail such as described in the next section back and forth using the same <reference> until both sides are satisfied.
<option>

The option parameter is used to specify call options. Some of the options can be REVERSE_CHARGE, or EXECUTIVE_BARGE_IN, JOIN, or other telephony features.
<call_data_list>

This parameter provides any <call-data-value> arguments associated with the call setup. When the Called Agent processes the call, the values of these arguments are used to setup the call as required. The following are some examples:

1. The <call-data-value> parameter can be a distinctive ringing pattern for a voice call to be played on the remote terminal;
2. In a call for movie on demand, the arguments may be the sound quality, the movie title, the language of the title, the viewing format etc.

<attachment>

Attachment is any MIME compliant contents. It can be fax, video, audio or text as defined in RFC 1521. The purpose of the attachment component is to enrich the contents of the call request E-mail so that as much information as possible can be carried in a single short message. In an outgoing call, additional caller information can be added to the call, e.g. a signature file of the E-mail. If it is text, it can be played out on a H.323 terminal as a call announcement rather than ringing. If it is a graphic, it can be displayed on graphic enabled terminals, e.g. PC or NC based H.323, rather than the default call alert user interface. To a great extent, because the attachment will be stored at the E-mail server associated with the Called Agent, the user can retrieve the information by any Unified Messaging System such as Exchange from Microsoft or Netscape Communicator from Netscape Communications.

One or more attachments may be included in the call setup message. There is really no limitation on the type of the attachment. Not all attachments may necessarily be processed by all implementations of the Called Agent.
<address>

The address can be the type presented but can also be extended. It can be any E.164 address, Internet protocol address, Internet protocol service address etc.

Explanation of the Fields of Reply E-mail Messages

Many of the fields in the reply message are the same as in the setup message, and as such, these will not be redefined here. The following fields are specific to the reply message:
<reply tag>

This field contains the application class specification "application/x-call-reply". As in the class specification for the setup message, if the IANA grants a new content type for telephony, this could be changed to content-type:telephony/call-reply.
<progress-indicator>

This set of parameters provides information on the progress of the call as in telephony. It helps to inform the caller about the current progress.
<connection>

This parameter indicates the acceptance of the call, and is a request to setup the call.
<non-accept-call-state>

This is an indicator of the current status of a call which has not yet been accepted and which may be rejected. The state may be RINGING if the callee's terminal is ringing, FORWARDED if the call is forwarded to another Called Agent, REJECT if the call is rejected by the callee, or DISCONNECT if the Called or Calling Agent request the termination of this call setup request.
<negotiation>

This parameter informs the Calling Agent or the Called Agent to change some of the setup parameters values. It may be the address of the caller, the address of a callee, or the quality of the call for example.

The following table contains an example of the contents of a call setup E-mail message:

| Line | Description |
| --- | --- |
| MIME-Version: 1.0 | MIME header |
| Content-type: application/ | application class |
| x-call; boundary=eot | |
| CALLER (E164M6137638533, "CK Wong") | Caller PSTN user identifier for CK Wong |
| CALLEE (E164, 6132322486) | Callee PSTN terminal number |
| MEDIUM VOICE | request setup a voice call |
| REFERENCE 0034332344 | call reference is the string "0034332344" |
| QUALITY ((GRADE,TOLLGRADE), (DELAY, 0)) | sound quality is toll grade with no delay, e.g. 64KPCM |
| OPTION ("RINGBACK_WHEN_NOT_BUSY") | a treatment is requested to inform the caller if the callee is busy now |
| Content-type: text; boundary=eom | This call has an attachment which can be used as call ID information. The message may be displayed on an ADSI terminal for the purpose of visual call waiting, the information can be displayed as part of a call alert on |

-continued

| Line | Description |
| --- | --- |
|  | an H.323 terminal, or the information can be used as an announcement of arrival for a conference call |
| This is a call from C.K.Wong | The message |
| --eom | End of attachment boundary |
| --eot | End of the message boundary |

The above example E-mail message is from a caller having telephone number 6136738533 to a callee having PSTN user identifier 6132322486 (which may or may not also be the callee's PSTN telephone number), with VOICE as the preferred medium, 0034332344 as the setup request reference, grade—tollgrade and delay=0 as quality specifications, the single option RINGBACK_WHEN_NOT_BUSY, and a text attachment containing the text "This is a call from C. K. Wong".

The following is an example of a call reply message:

| Line | Description |
| --- | --- |
| MIME-Version: 1.0 | MIME header |
| Content-type: application/ x-call-reply; boundary=eot | application class |
| CALL_OFFER_STATUS ACCEPT | The call is accepted |
| REFERENCE 0034332344 | To inform the Calling Agent that this call is for the call which has the reference "0034332344" |
| MEDIUM VOICE | The Called Agent agreed to setup a voice call |
| CALLER (E164, 6137638533) | The caller's directory number is not changed |
| CALLEE (IP,47.34.5.121) | The callee will connect the terminal on an H.323 terminal. Its IP address is "47.34.5.121". |
| QUALITY ((CODEC. G.729, G.711), (DELAY,15)) | The codec can be G.729 or G.711. The terminal can handle a maximum network delay of 15 milliseconds for any voice packet |
| --eot | End of the message boundary |

OUTGOING CALL INTERCEPTION

Outgoing Calls are intercepted in various manners depending upon the nature of the outgoing call.

Outgoing Call Interception: Wireline Terminal Call

When a wireline terminal 102 makes an outgoing call, the call is initially handled by the CO of the telco this being the local network interface 109 for a wireline terminal. The CO will do an address translation to find out how to deliver the call. For the MCSS, the address translation will result in the call being directed to the Calling Agent. The call request is forwarded from the relevant local network interface 109 to the Calling Agent 114 via a message through a communications link between the local network interface and the presentation driver 120 such as TCP/IP channel established on demand or earlier.

The caller's information is collected either from the dialling tone or pulse, or from an IDSN call setup message. If this is a normal fax call, it cannot be identified as such until later. However, if the call is done by a two stage dialling procedure, which includes a first number for the fax delivery and a second number for the final destination, the type of the call can be identified by the time Calling Agent is informed.

Figure 4:
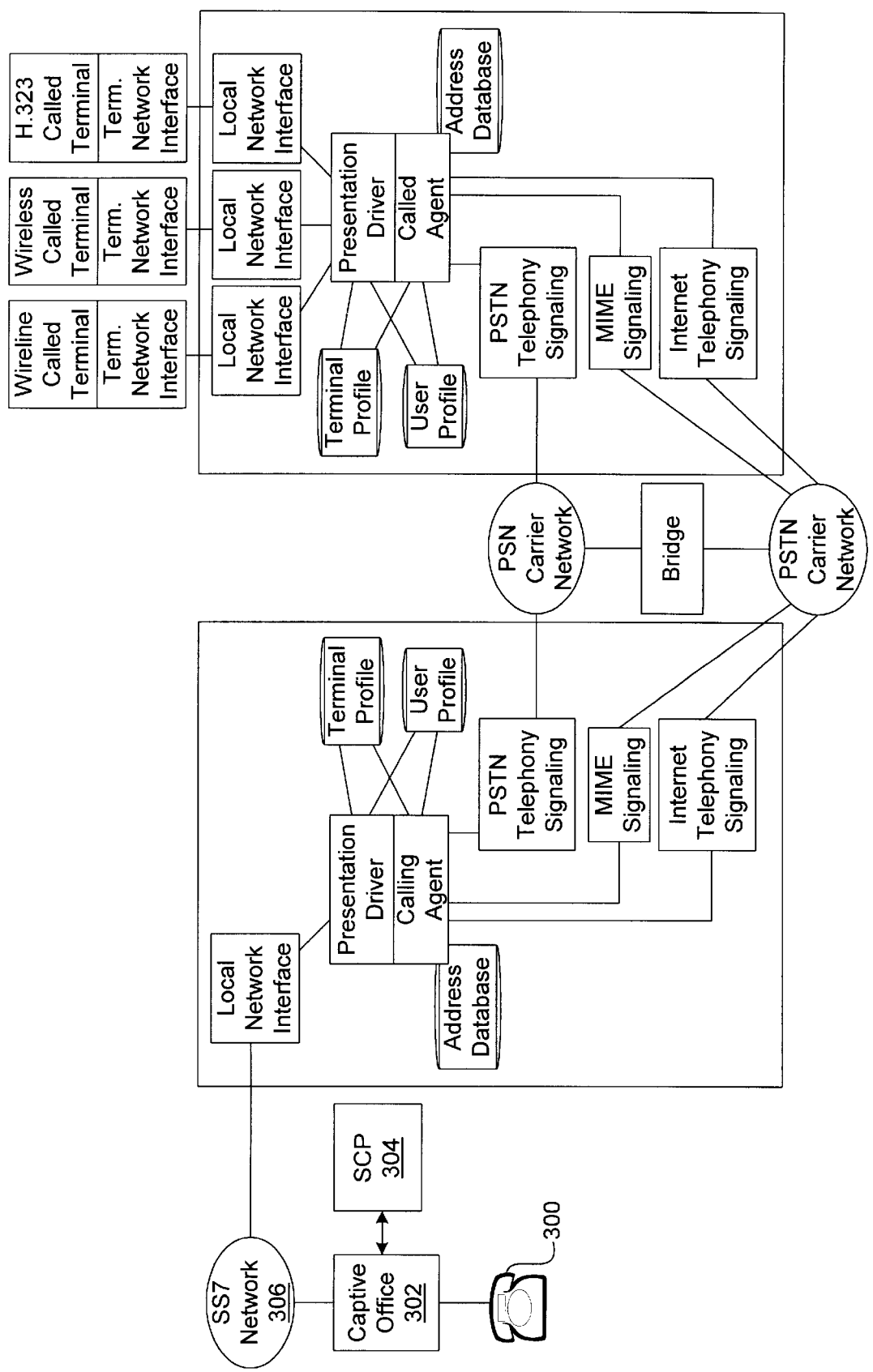
FIG. 4 is an abstract model of the system of FIG. 2 including a remote configuration.

In some cases, the call setup can be forwarded to the Calling Agent via a remote SCP query. It is not necessary to always be done from the local CO. The address translation can be handled via an SCP (signal control point) database. Most of the time now, it is handled by the SCP query. The SCP can reply with where the call is to be routed and with what treatment. This is illustrated in FIG. 4. In this example, a user makes an outgoing call from a terminal 300 which is initially handled by a CO 302.

The local Captive Office sends a query to an SCP 304 to find out where is the called address. The result from the query indicates that the called address is at another Captive Office. The call setup request is routed to a System Signalling #7 (SS7) network 306. The SS7 network delivers the call setup request to a Local Network Interface 308 of the outgoing MCSS end system 80. The request is received by the Local Network Interface 308 of the outgoing MCSS end system 80 and passed on to the presentation driver 120. The presentation driver 120 extracts the information in the CCS7 call setup message and passes the call setup request to the Calling Agent 114.

Outgoing call Interception: Wireless Terminal Call

A Celco uses a similar mechanism to the mechanism used by the above-described telco to intercept an outgoing call from a wireless terminal 104. The call setup request is sent to the Calling Agent.

Outgoing Call Interception for an Internet Call

When an H.323 terminal 106 makes an outgoing call, the outgoing call is intercepted by the local network interface 113 which in this case is a Gatekeeper.

Preferably, the Calling Agent will be the Gatekeeper for all the outgoing calls. This minimizes overhead and duplication. Alternatively a separate Gatekeeper may be used. One attribute required for an H.323 terminal is its IP address. If the Calling Agent does not handle the Registration and Administration Service for the dial-up line, the Gatekeeper performing Registration and Administration Services has to update the Calling Agent on the IP address.

The callee information is in an H.245 call setup request. The information can be extracted and forwarded to the Calling Agent.

In a specific implementation, the Calling Agent can be extended to support the H.323 call setup.

CALLED AGENT MESSAGE PROCESSING

The Called Agent, upon receipt of a call setup E-mail message together with the Calling Agent is responsible for coordinating the setting up of a connection between the calling terminal and one of the callee's terminals. In some cases, the Called Agent may respond with a call reply message. After the appropriate medium has been identified through negotiation if necessary, the relevant native signalling components are used to setup the connection, these including the telephony, signalling components 181,183 and the Internet signalling components.

How to Connect a Call from a PSTN Terminal to PSTN Terminal

For the purpose of this example, it is assumed that a connection from a wireline terminal 102 to a wireline terminal 136 is to be made.

Once the E-mail is received by the mail agent of the called party, the Called Agent (which is an application associated with the mail server) will process the E-mail. The association of the Called Agent program is done by the application tag in the MIME. The Called Agent will extract the called terminal identifier. There are two treatments that can be applied:

1. The Called Agent will interact with the telephony signalling components 172,174 to establish a voice channel from the captive office associated with the mail server to the captive office where the caller's call was intercepted. The channel is established using the caller's phone number in the E-mail. This ensures a voice channel is available. Then the Called Agent will use the local CO facility (in the local network interface 143 for the wireline terminal 136) to present the call to the callee based on the information associated with the callee's current location record maintained in the User Profile database. When the callee picks up the phone, the voice channel between the caller and callee is bridged. The setup process finishes after a reply message with CALL_OFFER_STATUS COMPLETE is sent to the caller.

2. The Called Agent will inform the Calling Agent regarding the current location of the callee in a reply mail. The <reference> in the E-mail is used to relate the reply to the call. Then the Calling Agent can establish a call to the callee's current true location using the existing conventional telephone protocol with the telephony signalling components 172,174. Either party can finish the call setup by sending a reply message with CALL_OFFER_STATUS COMPLETE to the other party.

How to connect a call from an H.323 terminal to a PSTN terminal

When the calling terminal is a PSTN terminal and the called terminal is an H.323 terminal, the call cannot go through directly. When the user's H.323 terminal 106 originates an outgoing call, it sends the request to the local network interface 113 which is the H.323 Gatekeeper. The Gatekeeper has the responsibility of performing the address lookup (because the address can be symbolic or alias names) which requires the address to be resolved into number dot notation (e.g.bmerib71.nortel.com is translated to 47.34.5121). This function is similar to the address translation in the PSTN Captive Office.

1. The dot notation address of the callee is used as a key to query the callee's information in the address database 186. This database maintains the mapping between the Internet address to the E-mail address of the callee's Called Agent.

2. The caller and callee address information, call medium, and other parameters are used to construct the E-mail for the call setup request.

3. The E-mail is sent to the callee's Called Agent. The Called Agent will respond with an E-mail including the callee's terminal identifier which will be an PSTN E.164 address. The Calling Agent makes a decision of whether the call is to be connected through the PSTN 170 or the PSN 178 or both based on billing and quality considerations. Once it is established that the calling terminal is an H.323 terminal and the called terminal is a PSTN terminal, there are existing procedures for using the PSTN telephony signalling components 172,174, the internet signalling components 181, 183, the PSTN 170, bridge 184 and PSN 178 to make a connection.

How to present a call from PSTN terminal to an H.323 terminal

When the callee is an H.323 terminal, again the call cannot go through directly. The Called Agent will construct a reply to inform the Calling Agent that the destination is actually an Internet address. The Calling Agent will route the call through either the PSTN or PSN depending upon billing and quality considerations. Once it is established that the calling terminal is a PSTN terminal and the called terminal is an H.323 terminal, there are existing procedures for using the PSTN telephony signalling components 172,174, the internet signalling components 181,183, the PSTN 170, bridge 184 and PSN 178 to make a connection.

In the two scenarios involving an H.323 terminal and a PSTN terminal, the quality option can be used to define the quality of service on an Internet phone call. Some of the options can be:

1. codec—because an H.323 terminal can decode a small number of compressed voice data, the type of codec must be explicitly stated;
2. link-speed—some H.323 terminals are linked by modem. Therefore, the communication link cannot exceed certain bandwidth.
3. video-data format—since H.323 can also support ITU standard T.120 (video conference), it may be necessary to specify parameters such as compression method and the data rate.

How to connect an H.323 terminal to an H.323 terminal

When connecting two H.323 terminals, the reply mail will contain Internet addresses for the caller and the callee. The Internet signalling components 181,183 can use the information together with the quality and option information to establish the call.

It should be noted that after a TCP/IP connection is established by the H.323 terminal for communication, the <grade> component in the E-mail can be used to specify the quality of service using the RSVP (resource reservation protocol) protocol. One of the problems with the RSVP protocol is that is it is receiver originated. Without the <grade> information, the callee where data is received can request the highest quality while the caller has to pay for the service. With the <grade> information, which can be a user feature to reduce the grade of service, the caller will not be overcharged.

CALL SETUP WALKTHROUGH

Figure 3:
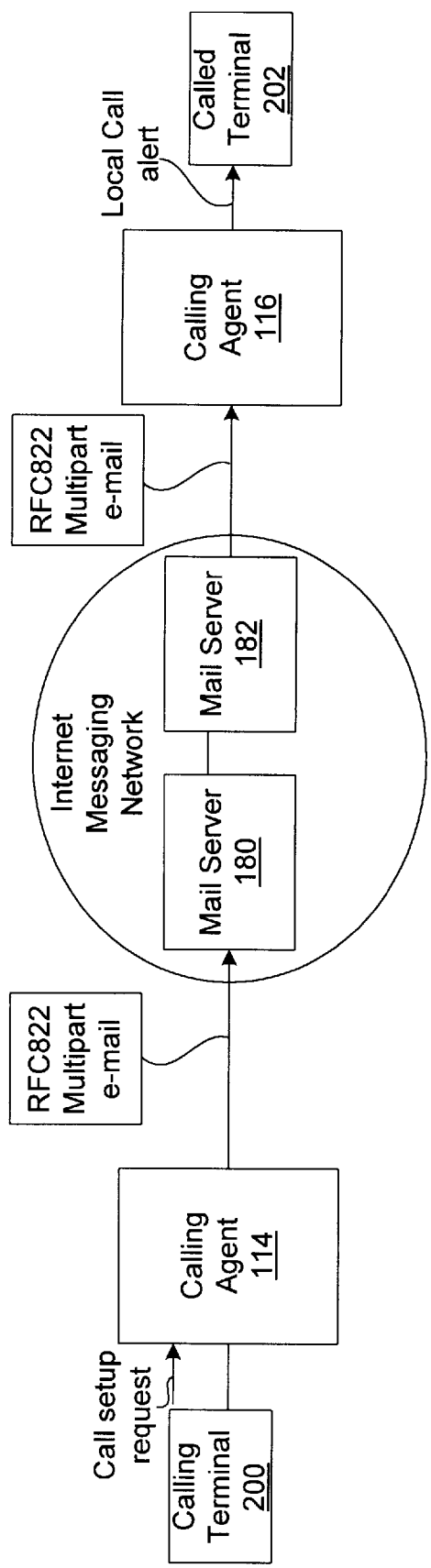
FIG. 3 is an example call setup walkthrough.

A call setup walkthrough will now be described in detail with reference to FIG. 3.

To begin, a user will originate a call from some calling terminal 200 (this being a particular one of the user's available terminals 102,104,106 shown in FIG. 2) resulting in a call setup request being generated. The call setup request which contains the callee's user identifier is passed through the terminal network interface (not shown) and the local network interface where it will be intercepted, converted to a generic form by the presentation driver (not shown), and passed to the Calling Agent. In POTS, the call is intercepted by the captive office. In GSM/PCS, the call is intercepted by the ground station or the cellstation. In an Internet call, the call is intercepted by an Internet gatekeeper.

Next, the Calling Agent 114 examines the called user identifer contained in the setup request and looks up a corresponding destination E-mail address in the address database (not shown). The Calling Agent will then generate an outgoing E-mail message to the address as described above. The E-mail message is then delivered by the calling end mail server 180 to the called end mail server 182 over the Internet. This E-mail should always be sent using the highest priority. The mail servers 180,182 should observe this priority and deliver the message as quickly as possible. Furthermore, messages received by the called end mail server 182 need to be processed quickly, almost in real time, and to be passed quickly to the Called Agent 116.

As soon as the mail is delivered to the Called Agent 116, the Called Agent will examine the contents of the E-mail message. The call originator's information will be extracted from the message. The Called Agent will identify the current terminal associated with the called party by looking up the relevant record in the user profile. There may be a negotiation stage (not shown in FIG. 3) during which call parameters are negotiated and settled. The Called Agent will then present the call to the current terminal using the native call setup. If the user is now associated with a cell phone, the call is delivered to the celco. If the user is now associated with the PSTN, the call is delivered to the telco. If the user is now associated with an H.323 terminal, the Called Agent will use H.323 to establish the call. The Called Agent will determine whether the preferred medium identified in the message matches that of the current terminal type. If it does not match, then a conversion is attempted. If no such conversion is possible, the call will be rejected with an appropriate reason. The rejection may be returned via a mail message with video, text, voice message and other multi-media data. The Called Agent may also choose to present the attachments to the destination terminal as part of the call presentation which, for example, may display graphics, video clips, audio clips, or alternative ringing. The Called Agent may also be configured to perform a personal agent function which for example may display incoming calls and respond to screened calls accordingly.

Supplementary Services

Preferably, conventional telephony services can be implemented or supported by this signalling system. The architecture of the network using this protocol is fundamentally indifferent from the existing implemented telephony network. Many of the services can be preserved. However, some of the call setup and billing support can be implemented differently. The following sections outline how to implement these using the capability offered by this invention.

CLASS Service

CLASS is Common Local Area Signalling Service. It provides a number of services ranging from display message to different ringing tone. These capabilities are readily available using the attachment components in the MIME message as described previously. The advantage of the signalling protocol is that video and graphics can also be added.

Caller ID

Caller ID refers to the caller's directory number (or the caller's IP address) and a character string corresponding to the name. The calling directory number is part of the call setup in PSTN. The character string relies on the local white page database. The current existing protocol cannot include the character string in the call setup signalling and as such Caller ID does not include the name in long distance calls. However, the invention provides the opportunity to include this information which makes the Caller ID name service extendable across long distance areas.

Call Forward

Call forward means the user of a particular directory number would like to receive future incoming calls at a different location. This can be easily done by changing the current terminal associated with the user.

Simple Call Management

The Agent based architecture provides an additional business opportunity for the telephone networks which may not otherwise be easily extended to support multi-media. The following describes three typical call scenarios which provide new capability for users. Collectively, all these scenarios can be treated the same way.

Destination Busy

When the destination is busy, the typical treatment is to let the caller decide to retry later. Addition opportunity and implementation may be made available to charge the user on a per usage basis to ring back. This can be an option specified by the caller in the user profile.

Call Not Answered

When the callee is not around the terminal, the call can be offered, but no body is going to answer it.

Call Rejection

Because of the attachment, a callee will know who is calling. The call can be rejected from an H.323 terminal or an ADSI terminal with a visual call waiting feature.

Treatment

When one of the above scenarios happens, the user can be presented with the following options:

1. leave a voice message for the callee in which case the message will be digitized by the Calling Agent. The digitized message will be sent and attached to a call setup reply message as an attachment.

2. send a fax to the caller which can be retrieved by the callee later. The fax will be stored by the Calling Agent and sent to the Called Agent which will attach the fax to a call setup reply message as an attachment.

Unified Messaging Support (UMS)

This invention allows the telephony services to evolve around a UMS. Users can use the UMS to get the caller id record, voice message, fax message or event text message.

Call Transfer

If the call transfer is within the same network, existing telephony protocols (except Internet terminal) have a well defined procedure to handle the transfer. These are replicated here.

This invention does not provide a new support to transfer calls between different networks or media. However, because the Calling Agent and Called Agent can be extended to monitor the life cycle of a call, it can provide support and coordinate the transfer calls between different networks and media using the following procedures.

Transfer Between Different Network Types

1. The user will signal the Agent (Calling or Called Agent) to perform the call transfer either through in-band (flash and dial) or out-of-band signalling from another terminal.

2. The Agent will request the local network interface to disconnect the voice channel connected to terminal.

3. The Agent will command the interface to the telephony network.

4. Another call is established to the new destination under the control of the Agent through a gateway.

5. After the new call to the new destination is established, the voice channel from the network is routed to the new destination.

Transfer Between Different Media Types

1. The user will signal the Agent (Calling or Called Agent) to perform the call transfer either through in-band (flash and dial) or out-of-band signalling from another terminal.

2. The Agent will request the local network interface to disconnect the voice channel connected to terminal.

3. The Agent will command the interface to the telephony network to suspend the call.

4. Another call is established to the new destination under the control of the Agent through a gateway. This gateway will be responsible for the conversion of the medium type, e.g. codec.

5. After the new call to new destination is established, the voice channel from the network is routed to the new destination.

Detailed Description of Call Transfer Interface

From PSTN Network

The first step in switching to another terminal is to suspend the current call and signal the switch for the transfer. The following scenarios describe the common procedure used to suspend the current call and signal the switch for the transferring.

1. From an analog terminal, user will flash and perform a call forward operation.
2. From a digital set, e.g. ISDN, the terminal will send a supplemental service message to request the terminal to be forwarded.

Once the call is suspended, the user can signal a request to be connected to the Call Agent which can handle the call transfer. One way to request to be connected to the Call Agent is to use the "*nn" convention. For example, the code "*11" can be assigned for this function.

After the call is suspended, the user can press "*11" and log on to the Calling Agent with appropriate identification and authentication. From the data where the input is coming from, the Calling Agent can identify the suspended call. Then the user can instruct how the call will be forwarded. There are two treatments to his request.

1. The feature can limit the transfer among the terminals subscribed by the user. It does not allow the user forward to any other terminal. However, if the user wants to forward to any other terminal, there may be an existing call forward supplementary feature to support it.
2. The call forward can be to the terminals for which the user subscribed to the service and any other terminals. In this case, the interaction can be designed to prompt the user to determine which kind of transfer will be required. For the subscribed terminal, the user can select from a list presented by the Calling Agent. For any other terminal, the user enters the destination directory number. The Calling Agent will use the existing supplementary services to perform the call transfer. There are two treatments to support this service. In the first, the customer must subscribe to the supplementary service before it can use this feature, and in the second, the telco/celco can charge the user on per usage basis.

If the destination is a PSTN directory number (DN), the switch can use existing software to perform the call forwarding.

If the destination is an H.323 terminal, the call is routed through Voice Over IP Gateway.

From H.323 Terminal

If the destination is another H.323 terminal, it can use the supplementary services to be defined for the H.323 to perform the call transfer.

If the destination is a PSTN terminal, the call can be routed to an Internet Terminal Gateway.

Alternate Access to the Calling Agent

When a customer is away from the set of registered terminals, he can access the Calling Agent using different vehicles. This section describes several possible implementations.

All these procedures incur the authentication of the user. The charge can be made to the user's account rather that the owner of the terminal.

Access from POTS or Equivalent

The following procedure can be used from a terminal which has a telephony key pad and no other display device such as a POTS terminal.
1. Dialing a special designated terminal number which will connect the voice channel to a IVR (interactive voice response) system which is a front end of the Calling Agent. This IVR system will collect the information and forward the information to the Calling Agent.
2. Log on using the user's account name and password.
3. The IVR system prompts the user for the destination terminal number.
4. If there is no called address handler go to step 7.
5. If called address has a handler, the handler will be activated and connects to the voice channel.
6. When the called address's handler has finished, go to step 7.
7. Calling Agent constructs the MIME message and uses MCSS to establish the call.

Access from ADSI Terminal or Equivalent

The following procedure can be used to establish a call from an ADSI (analog display services interface) terminal which has a display and programmable buttons.
1. Dial a special number on an ADSI server which has support for MCSS.
2. The user performs the log on using the user's account name and password.
3. The ADSI server will download an ADSI script to prompt the user with additional destination information such as:
  callee address
  medium (e.g. voice or fax)
  quality (using PSTN long distance or through Internet Gateway)
4. If there is a callee address handler, an ADSI script can be downloaded to the terminal to acquire more information.
5. When the data input is completed, the Calling Agent receives all the information and proceeds with the call setup.

Access from an H.323 Terminal with Web Browser Support

The following procedure can be used to establish a call from an H.323 Terminal with Web Browser support.
1. Access a Universal Resource Locator of the Calling Agent
2. Perform log on using the user name and password with encryption enabled and a public key used.
3. The Calling Agent's Web interface will download a form to acquire the callee address information.
4. If there is a callee address handler, the callee address handler will send another form to collect more data.
5. After all information is collected, the Called Agent performs an Internet terminal call setup on behalf of the caller. The call will be a callback type which means the destination call originate the H.323 call.

Create Attachment for the Call

The call setup E-mail has the capability to include fax, video clip and voice clip. The following description outlines how these contents can be created and included in the MIME message.

Attach Voice Clip to a PSTN Call

The following procedure can be used to create a call with a voice clip included.
1. User calls a special number to connect to the Calling Agent.
2. The user will use the password to authenticate his/her identity.
3. The user records a voice clip.
4. The user instructs the Calling Agent to call a destination.

Attach Fax to a PSTN Call

The following procedure can be used to attach a faxed document to a PSTN call.
1. User calls a special number to connect to the Calling Agent.
2. The user informs the Calling Agent to prepare a call with a Fax attachment.
3. The Calling Agent gives a terminal number and password to the user.
4. The terminal number is a fax reception server. The password allows an association of the fax uploaded and the current call request.
5. The user dials the terminal number to prepare the fax.
6. The fax server will ask the user to enter the password.
7. If accepted, the fax protocol for transmission is carried out.
8. Once the fax transmission is complete, the Calling Agent can construct the MIME message to establish the call or just deliver the Fax.

In an alternative to this procedure a user can access the fax server, with proper authentication using password, and fax the document. The fax server will provide a fax identification which can be used to instruct the Calling Agent to extract the fax from the fax server to construct the MIME message. With this technique only one terminal call is active at a given time so the user can have a single line for fax and voice call.

Similar functions can be executed on a PC which connects to the Calling Agent via a dial up line or Ethernet. In this case, the file can be sent to an FTP (file transfer protocol) server rather than a Fax server.

Access to MIME Messages Through UMS

The call setup messages are delivered as MIME message. They can be stored on a Unified Messaging Systems' (USM) message server such as Microsoft's Exchange, Sun's Solstice or Lucent's Intuity. The interface to these message will provide access to various components constituting the call setup message.

Caller Information

The caller's call setup requests are stored as E-mails or messages on the Unified Messaging System. These E-mail are the equivalent of the caller identification records on a Caller ID device.

Attachment

The UMS interface can retrieve and present the attachment (such as the text message, voice message, fax or even video) to the user.

Signal Flow Examples

Various signal flow examples will now be described with reference to FIGS. 6–12. In these figures, the numbered arrows represent message flows.

Figure 6:
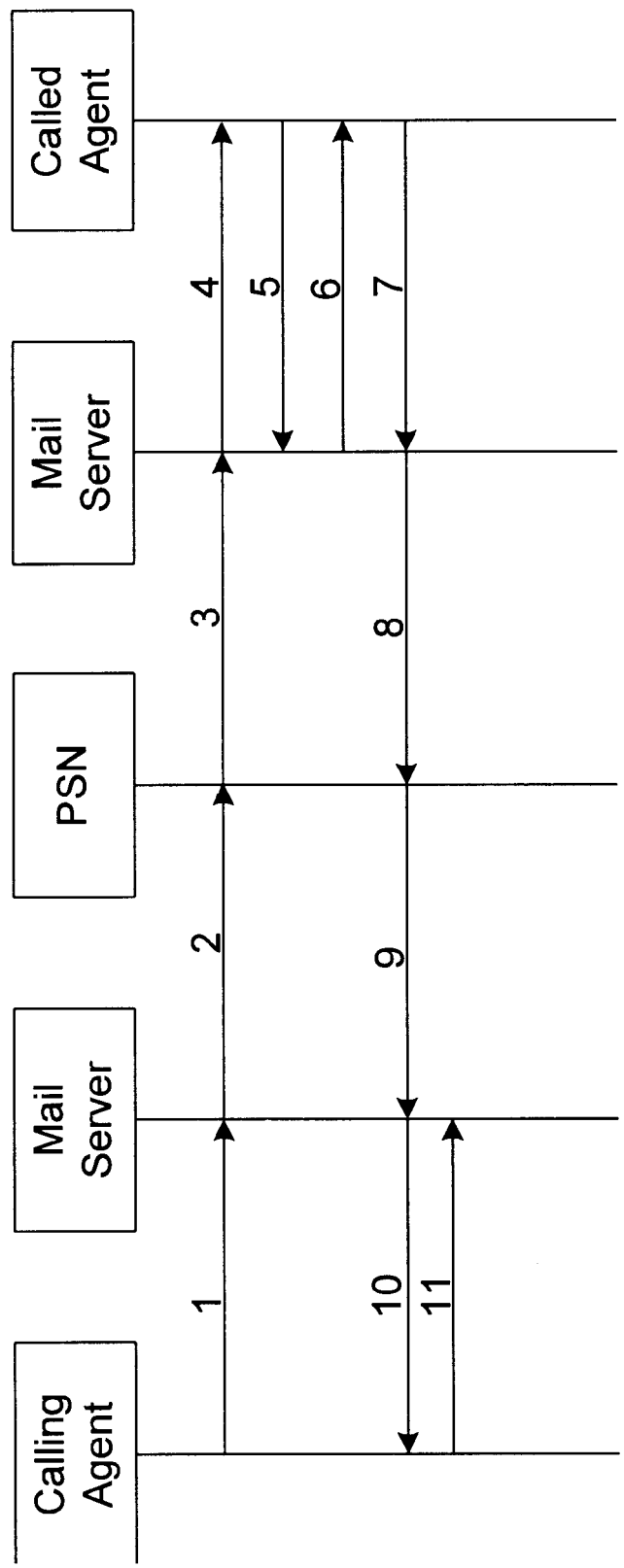
FIGS. 6–12 are signal flow diagrams for further examples of call setup functions and telephony services.

FIG. 6 shows the message flow for a basic voice call. In step 1, the Calling Agent constructs the call setup request message and sends it to the mail server to be sent to the Called Agent. In step 2, the mail server sends the E-mail to the PSN network. In step 3, the E-mail arrives at the Called Agent's mail server. In step 4, the Mail Server notifies the mail client which is the Called Agent of the arrival of the E-mail. In step 5, the Called Agent issues a command (using the mail protocol) to retrieve the E-mail. In step 6, the E-mail is delivered to the Called Agent. In step 7, the Called Agent constructs a reply and sends this to the mail server. In step 8, the mail server sends the E-mail to the PSN. In step 9, the E-mail arrives at the Calling Agent's mail server. In step 10, the mail server sends a notification to the Calling Agent. In step 11, the Calling Agent requests the mail server to deliver the E-mail. In step 12, the mail server delivers the E-mail to the Calling Agent and the Calling Agent uses the information in the reply message to establish the call.

Figure 7:
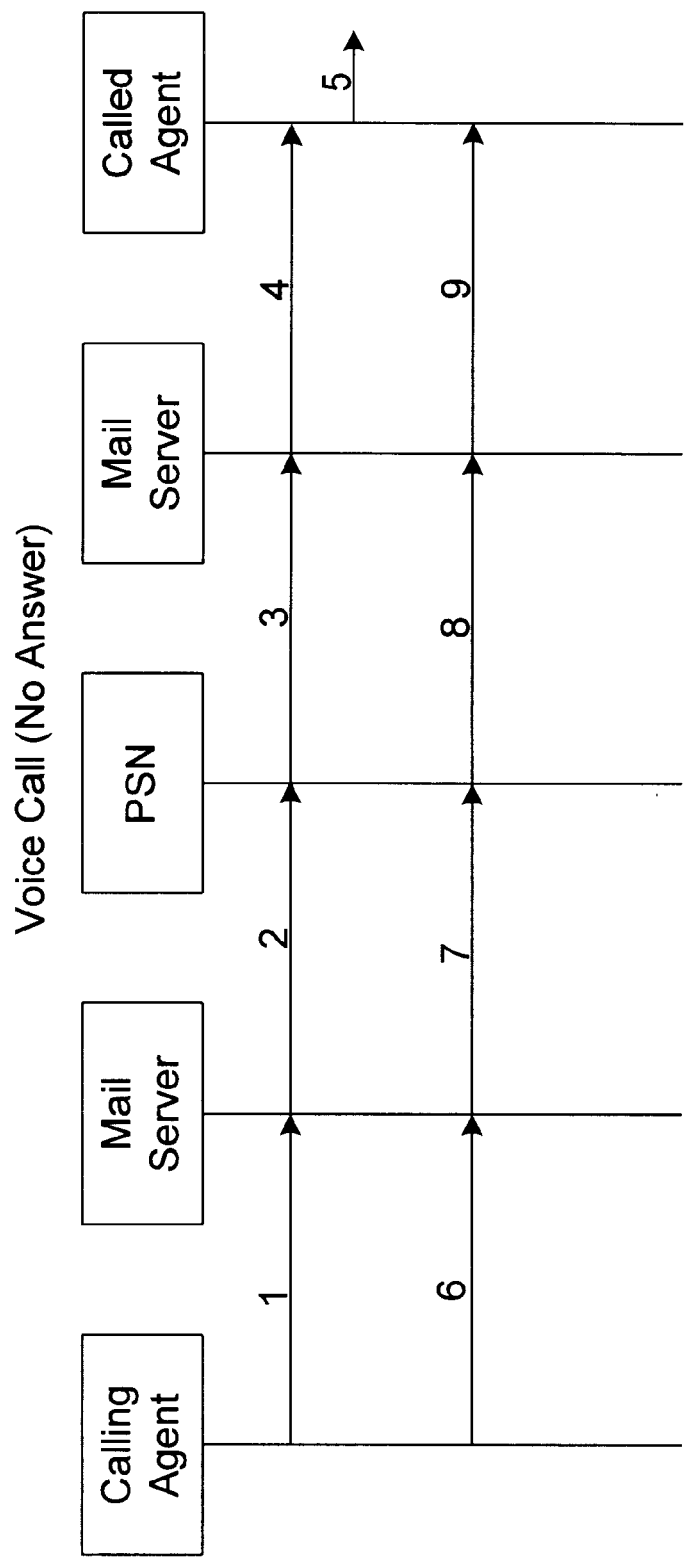

FIG. 7 shows the message flow for a voice call with no answer. In step 1, the Calling Agent constructs the call setup request message and sends it to the mail server to be sent to the Called Agent. In step 2, the mail server sends the E-mail to the PSN network. In step 3, the E-mail arrives at the Called Agent's mail server. In step 4, the Mail server notifies the mail client which is the Called Agent of the arrival of the E-mail. In step 5, the Called Agent presents the call to the terminal through the presentation driver. In step 6, the user creates an attachment. The attachment can be voice message, fax, or graphics. The Calling Agent creates a reply message and passes it to the mail server. In step 7, the mail server sends the E-mail. In step 8, the mail is delivered to the Called Agent mail server. In step 9, the mail server sends a message arrival notification to the Called Agent will store the reply message with attachment to be retrieved by the user later.

Figure 8:
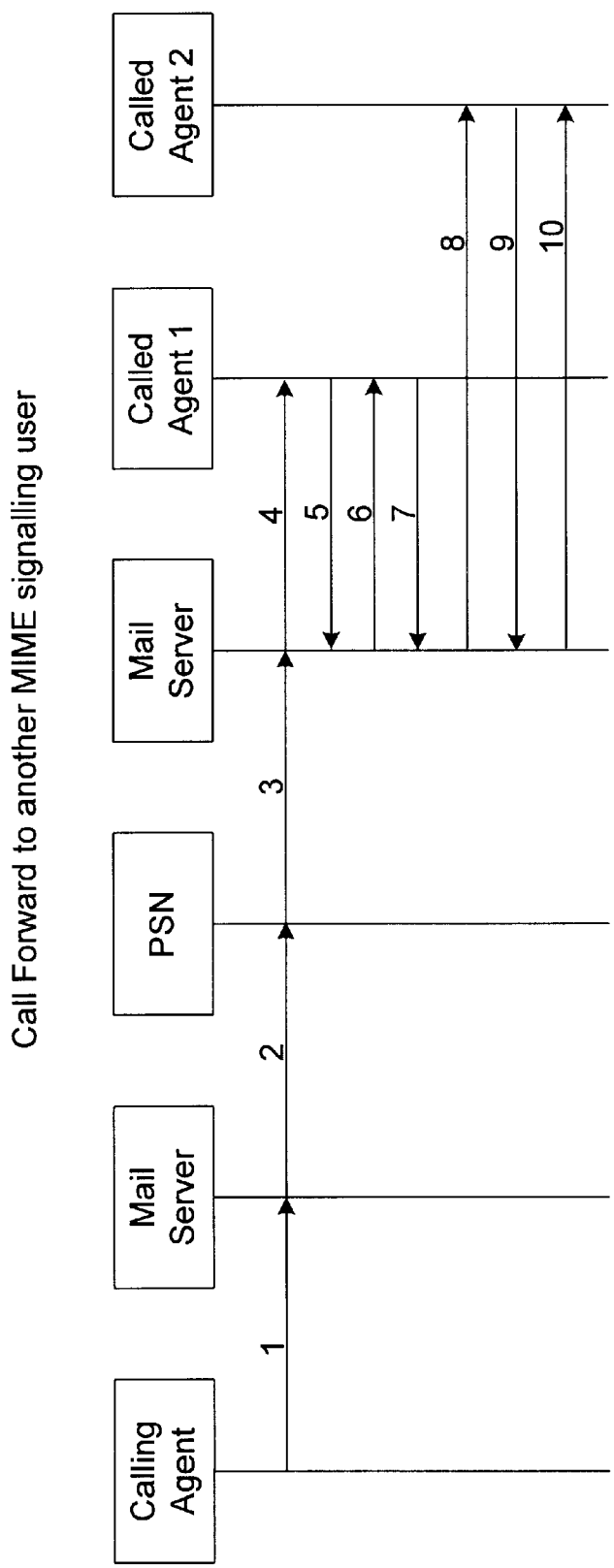

FIG. 8 shows call forwarding to another MCSS user. In step 1, the Calling Agent constructs the call setup request message and sends it to the mail server to be sent to the Called Agent. In step 2, the mail server sends the E-mail to the PSN network. In step 3, the E-mail arrives at the Called Agent's mail server. In step 4, the mail server notifies the mail client which is the Called Agent 1 of the arrival of the E-mail. In step 5, the Called Agent 1 requests the mail server to deliver the E-mail. In step 6, by examining the user profile, the Called Agent 1 finds out that the call is to be forwarded to another user handled by Called Agent 2. In step 7, the Called Agent 1 instructs the mail server to forward the E-mail to the Called Agent 2. In step 8, the mail server delivers a message arrival notification to Called Agent 2. In step 9, the Called Agent 2 requests the mail server to deliver the mail. In step 10, the call setup request message is sent to the Called Agent 2. The Called Agent 2 can either initiate negotiation or accept the call.

Figure 9:
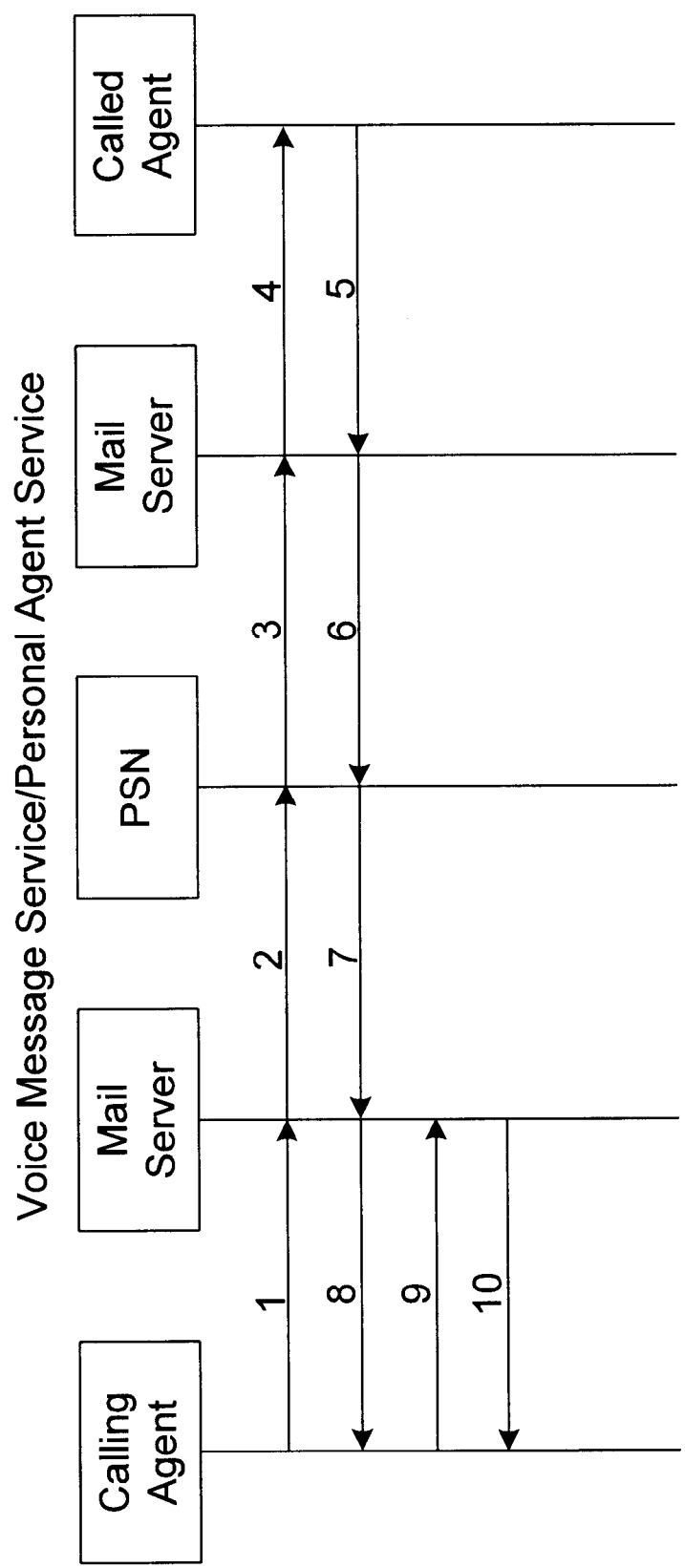

FIG. 9 shows the voice message service/personal agent service. In step 1, the Calling Agent constructs the call setup request message and sends it to the mail server to be sent to the Called Agent. In step 2, the mail server sends the E-mail to the PSN network. In step 3, the E-mail arrives at the Called Agent's mail server. In step 4, the mail server notifies the mail client which is the Called Agent of the arrival of the E-mail. In step 5, after consulting the user profile, the Called Agent constructs a reply message which will connect the call to a voice message service server or a personal agent service server. The redirection in done by specifying the called address of where the call can be completed by the Calling Party. The reply message is passed to the mail server. In step 6, the mail server sends this to the network. In step 7, the reply mail is delivered to the mail server. In step 8, the mail server sends a message arrival notification to the Calling Agent. In step 9, the Calling Agent requests the mail server to deliver the message. In step 10, the mail server delivers the reply message to the Calling Agent. The Called Agent examines the contents of the reply and determines the call is accepted, and instructs the signalling components to complete the call without answering. The call is actually delivered to a voice message service or personal agent service.

Figure 10:
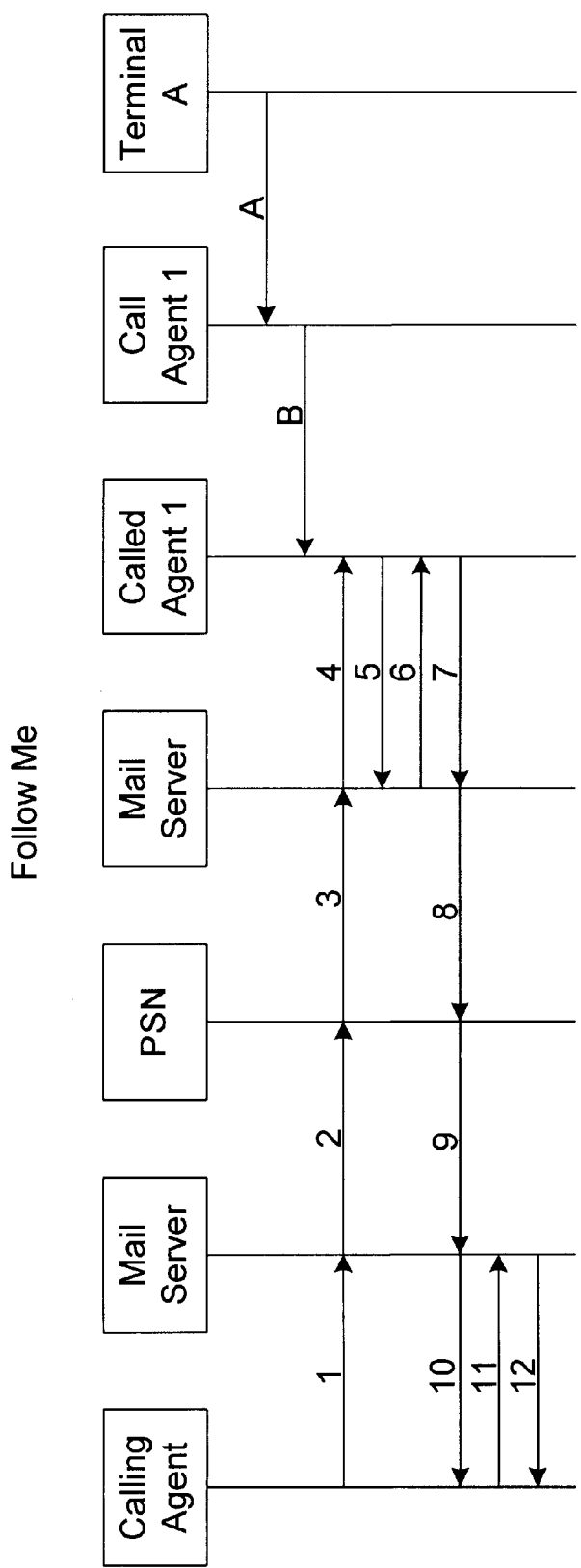

FIG. 10 shows the "follow me" scenario. The user is now at a terminal which is not controlled by the Called Agent for the user. He/She first connects to the Call Agent of the user. He/She instructs the Call Agent to change the user profile to deliver calls to a specific terminal by giving its address. The Call Agent for the user collects the information and updates the user profile to be used by the Called Agent. In step 1, the Calling Agent constructs the call setup request message and sends it to the mail server to be sent to the Called Agent. In step 2, the mail server sends the E-mail to the PSN network. In step 3, the E-mail arrives at the Called Agent's mail server. In step 4, the Mail Server notifies the mail client which is the Called Agent of the arrival of the E-mail. In step 5, the Called Agent requests the mail server to deliver the E-mail. In step 6, by examining the user profile, the Called Agent finds our that the call is forwarded to Terminal A. In step 7, the Called Agent constructs a reply message which accepts the call with Terminal A's address as the Callee Address. The message is passed to the mail server. In step 8, the mail server send the mail to the PSN. In step 9, the PSN delivers the mail server. In step 10 the mail server sends a message arrival notification to the Calling Agent. In step 11, the Calling Agent requests the mail server to deliver the message. In step 12, the mail server delivers the E-mail to the Calling Agent. The Calling Agent extracts the message and finds out it is an accept reply message. It instructs the telephony signalling components to complete the call using the address in the reply message.

Figure 11:
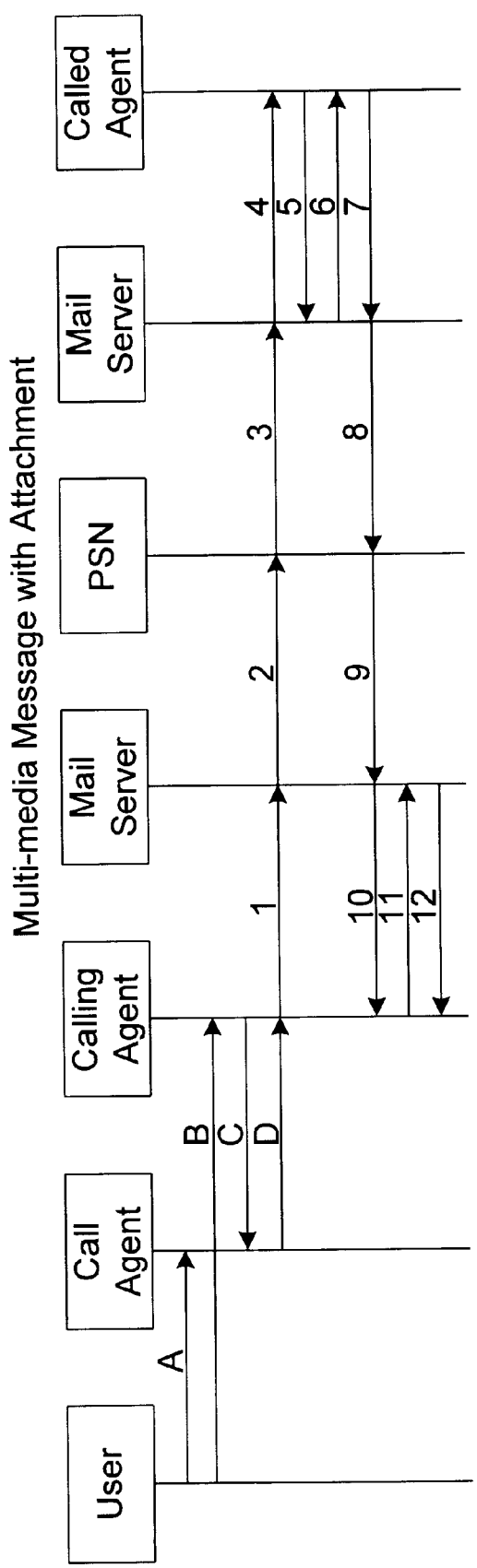

FIG. 11, shows a multi-media message with attachment. The user connects to the Call Agent to provide the contents of a multi-media message. The user can record a voice message. He/She can fax the document to the Call Agent. He/She can upload an electronic file using File Transfer Protocol to the Call Agent. The Call Agent provides an identity to every artifact stored. The user connects to Calling Agent and instruct the Calling Agent to establish an outgoing call using the artifacts stored at the Call Agent. The Calling Agent asks the Call Agent to provide the artifacts using the id provided by the user. The Call Agent sends the electronic copy of the artifact to the Calling Agent. In step 1, the Calling Agent constructs the call setup request message with all the artifacts as attachments and sends it to the mail server to be sent to the Called Agent. In step 2, the mail server sends the E-mail to the PSN network. In step 3, the E-mail arrives at the Called Agent's mail server. In step 4, the Mail Server notifies the mail client which is the Called Agent of the arrival of the E-mail. In step 5, the Called Agent issues a command (using the mail protocol) to retrieve the E-mail. In step 6, the E-mail is delivered to the Called Agent. In step 7, the Called Agent extracts the attachments and presents them to the terminal selectively according to the terminal capability described in the terminal profile. Later it constructs a reply and sends this to the mail server. In step 8, the mail server sends the E-mail to the PSN. In step 9, the E-mail arrives at the Calling Agent's mail server. In step 10, the mail server sends a notification to the Calling Agent. In step 11, the Calling Agent requests the mail server to deliver the E-mail. In step 12, the mail server delivers the E-mail to the Calling Agent. The Calling Agent extracts the contents in the reply message to terminate the call with information in the reply or initiate negotiation or initiate a call setup using the signalling components.

Figure 12:
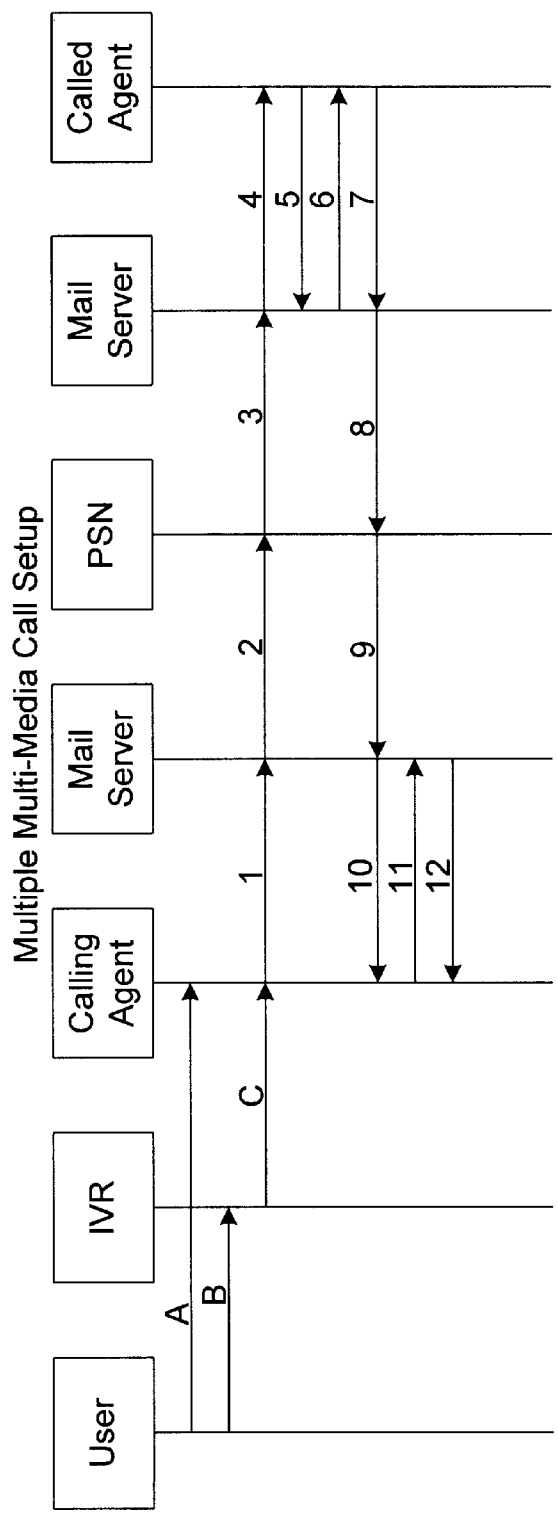

FIG. 12 shows a multiple multi-media call setup. The user connects to the Calling Agent and requests a multiple-call setup request. The Calling Agent redirects the user's call to an IVR system to collect the multiple call setup request. When the data collection is complete, the IVR system passes the multiple call setup request the Calling Agent. In step 1, the Calling Agent constructs the call setup request message with multiple call requests. In step 2, the mail server sends the E-mail to the PSN network. In step 3, the E-mail arrives at the Called Agent's mail server. In step 4, the Mail Server notifies the mail client which is the Called Agent of the arrival of the E-mail. In step 5, the Called Agent issues a command (using the mail protocol) to retrieve the E-mail. In step 6, the E-mail is delivered to the Called Agent. In step 7, the Called Agent extracts the call requests from the message and constructs a reply to accept all the calls. In step 8, the mail server sends the E-mail to the PSN. In step 9, the E-mail arrives at the Calling Agent's mail server. In step 10, the mail server sends a notification to the Calling Agent. In step 11, the Calling Agent requests the mail server to deliver the E-mail. In step 12 the mail server delivers the E-mail to the Calling Agent. The Calling Agent sets up calls using the address information in the message.

An attachment may be presented to the terminal without completing the call if the called party chooses this option.

Numerous modifications and variations of the present invention are possible in light of the above teachings. It is therefore to be understood that within the scope of the appended claims, the invention may be practised otherwise than as specifically described herein.

In the illustrated embodiments, the Called Agent and the Calling Agent are network components. Alternatively, these can be migrated to terminals. This can be realized by a network-wide distributed implementation of these components.

I claim:

1. A multimedia call signalling method comprising the steps of:

a) a calling agent receiving from a calling terminal of a first user served by the calling agent a call setup request containing a called user identifier and looking up an electronic network address associated with the called user identifier;

b) the calling agent sending a call setup electronic message with said electronic network address to a called agent;

c) the called agent maintaining a user profile database comprising for each of a plurality of users served by the called agent a respective plurality of terminal identifiers of terminals of the user, each plurality of terminal identifiers identifying terminals of at least two different protocol types;

d) the called agent associating with each of the plurality of users served by the called agent a selection of a current terminal at which the user expects calls to be directed;

e) the called agent receiving the call setup electronic message and associating the call setup message with a particular user of said plurality of users served by the called agent, and the called agent looking up the current terminal associated with the particular user; and f) the called agent and the calling agent coordinating a call setup between a calling terminal and the current terminal associated with the particular user thereby resulting in a connection between the calling terminal and the current terminal.

2. A method according to claim 1 wherein said call setup request is originated from said calling terminal.

3. A method according to claim 1 wherein said call setup request is originated from a user interface.

4. A method according to claim 1 wherein said call setup request contains requests for multiple connections between the calling terminal and the current terminal associated with the particular user.

5. A method according to claim 1 wherein said call setup electronic message is associated with the particular user on the basis of a field included in the call setup electronic message.

6. A method according to claim 1 wherein the field is the called user identifier.

7. A method according to claim 1 wherein the call is setup over one of a plurality of network media.

8. A method according to claim 1 wherein the call is connected through either a PSTN network or a PSN network.

9. A method according to claim 1 further comprising the step of:

the calling agent and the called agent communicating with each other through reply electronic messages to negotiate parameters for the call to be setup.

10. A method according to claim 1 further comprising the step of the calling terminal including one or more attachments in the call setup request which are subsequently included by the calling agent in the call setup electronic message and which are presented on the current terminal.

11. A method according to claim 1 further comprising the step of a called presentation layer connected between the called agent and the current terminal performing a receive type conversion on signals received through the connection from the calling terminal from a transmission format used over the connection to a current terminal format required by the current terminal and performing a transmit type conversion on signals to be sent through the connection by the current terminal format to the transmission format.

12. A method according to claim 11 further comprising the step of a called presentation layer performing a type conversion on the attachments to convert them to a type which is processable by the called terminal.

13. A method according to claim 1 wherein the step of coordinating the call setup comprises the steps of:
  determining one or more networks which are to be used for the call; and
  using native network signalling components associated with said networks to setup the call and make said connection.

14. A method according to claim 1 wherein said called user identifier can be any one of the plurality of terminal identifiers of the user served by the called agent.

15. A method according to claim 14 wherein the electronic network address is an electronic mail address which identifies the particular user and the called agent, wherein the called agent associates the call setup request with the particular user on the basis of the electronic mail address.

16. A method according to claim 14 further comprising:
  the calling agent including the called user identifier in the call setup electronic message.

17. A method according to claim 16 wherein the called agent associating the call setup request with a particular user served by the called agent is done on the basis of the called user identifier included in the call setup electronic message.

18. A method according to claim 1 further comprising the called agent receiving for each of the users served by the called agent a selection of which of said plurality of terminal identifiers of terminals of the user served by the called agent is to be the current terminal for that user.

19. A method according to claim 1 wherein receiving a call setup request from the calling terminal comprises receiving the call setup request from any one of a plurality of terminals of the first user served by the calling agent, the plurality of terminals including terminals of at least two different types.

20. A method according to claim 19 further comprising the step of a calling presentation layer connected between the calling agent and the calling terminal performing a transmit type conversion on signals received from the calling terminal to a transmission format used over the connection and performing a receive type conversion on signals received over the connection from the transmit format used over the connection to the calling terminal format.

21. A multimedia call signalling end system comprising:
  a) means for coordinating the establishment of an outgoing connection between a calling terminal which is any one of a plurality of calling terminals of at least two different protocol types of a first user served by the multimedia call signalling end system and a current terminal of a second user having a plurality of terminals served by another multimedia call signalling end system;
  b) means for maintaining an electronic network address in association with all of the second user's plurality of terminals, the electronic network address belonging to the another multimedia called signalling end system designated to process any calls to the second user;
  c) means for receiving a call setup request from the calling terminal including a particular terminal identifier of any of said second user's plurality of terminals;
  d) means for looking up an electronic network address corresponding with the terminal identifier;
  e) means for generating a call setup electronic message with said electronic network address and sending it to said electronic network address; and
  f) means for receiving a reply message to said call setup electronic message, the reply message specifying the current terminal of the second user to which calls initially specifying any of said second user's plurality of terminals are to be directed.

22. A system according to claim 21 wherein said means for receiving a call setup request receives the request from the calling terminal.

23. A system according to claim 21 further comprising a user interface for receiving the call setup request.

24. A system according to claim 21 further comprising a terminal profile database containing a terminal profile for each of a user's terminals which are served by the system including a terminal type for each terminal, wherein the calling terminal is one of the terminals.

25. A system according to claim 24 wherein a canned terminal profile is used when the calling terminal is not included in said terminal profile database.

26. A system according to claim 24 further comprising a user profile database containing an identification of which of said user's terminals a user is currently using.

27. A system according to claim 21 wherein said means for maintaining comprises an address translation database containing a mapping from each terminal identifier to said electronic network address.

28. A system according to claim 21 wherein said outgoing connection is established over a packet switched network or a public switched telephone network depending upon billing and quality considerations, in cooperation with signalling components with the selected network.

29. A system according to claim 21 further comprising local network interfaces to each of the first user's calling terminals for supporting calling terminals of various protocol types including cellular terminals, wireline terminals, and H.323 terminals.

30. A system according to claim 21 further comprising:
  means for performing a receive type conversion on signals received through the outgoing connection from the current terminal from the transmission format used over the outgoing connection to a calling terminal format required by the calling terminal if the calling terminal format is different from the transmission format, and for performing a transmit type conversion on signals to be sent through the outgoing connection from the calling terminal format to the transmission format if the calling terminal format is different from the transmission format.

31. A system according to claim 21 further comprising means for handling incoming call setup electronic messages comprising:
  a) means for maintaining for each of a plurality of users served by the system a selection from a plurality of the users terminals of a current terminal to which calls are to be directed;
  b) means for receiving an incoming call setup electronic message, the incoming call setup electronic message including a user identifier;
  c) means for looking up a current terminal identifier which identifies a current terminal associated with the user identifier and responding to the incoming call setup message with a reply message specifying the current terminal; and d) means for coordinating the establishment of an incoming connection between the current terminal and another terminal which originated the incoming call setup.

32. A system according to claim 31 adapted to be connected to a network comprising a packet switching network (PSN) and a public switched telephone network (PSTN), and wherein said means for coordinating the establishment of an outgoing connection participates in the selection of either the PSN or the PSTN for the outgoing connection, and then cooperates with a native signalling component for the selected network to make the outgoing connection, and wherein said means for coordinating the establishment of an incoming connection participates in the selection of either the PSN or the PSTN for the incoming connection and then cooperates with a native signalling component for the selected network to make the incoming connection.

33. A system according to claim 31 wherein said means for coordinating the establishment of an outgoing and incoming connection respectively participate in a determination of a transmission format each said connection, the system further comprising:

means for performing a receive type conversion on signals received through the incoming connection from a transmission format used over the incoming connection to a current terminal format required by the current terminal if the current terminal format is different from the transmission format, and for performing a transmit type conversion on signals to be sent through the incoming connection from the current terminal format to the transmission format if the current terminal format is different from the transmission format; and means for performing a receive type conversion on signals received through the outgoing connection from a transmission format used over the outgoing connection to a calling terminal format required by the calling terminal if the calling terminal format is different from the transmission format, and for performing a transmit type conversion on signals to be sent through the outgoing connection from the calling terminal format to the transmission format if the calling terminal format is different from the transmission format.

34. A system according to claim 21 further comprising an interface to a Unified Messaging System or personal agent service.

* * * * *

UNITED STATES PATENT AND TRADEMARK OFFICE
CERTIFICATE OF CORRECTION

PATENT NO. : 6,185,288 B1
DATED : February 6, 2001
INVENTOR(S) : Chi-Keung Wong

Page 1 of 1

It is certified that error appears in the above-identified patent and that said Letters Patent is hereby corrected as shown below:

Column 32,
Line 59, the words "to be" should be deleted.

Column 34,
Line 58, change "users" to -- user's --.

Signed and Sealed this

Seventh Day of May, 2002

Attest:

Attesting Officer

JAMES E. ROGAN
Director of the United States Patent and Trademark Office